US011167669B2

(12) United States Patent
Sekizuka

(10) Patent No.: US 11,167,669 B2
(45) Date of Patent: Nov. 9, 2021

(54) VEHICLE SEAT

(71) Applicant: TOYOTA JIDOSHA KABUSHIKI KAISHA, Toyota (JP)

(72) Inventor: Makoto Sekizuka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/541,223

(22) Filed: Aug. 15, 2019

(65) Prior Publication Data

US 2020/0108748 A1 Apr. 9, 2020

(30) Foreign Application Priority Data

Oct. 3, 2018 (JP) .................................. 2018-188561

(51) Int. Cl.
*B60N 2/427* (2006.01)
*A47C 31/12* (2006.01)
*B60R 22/18* (2006.01)
*A44B 11/25* (2006.01)
*B60R 22/26* (2006.01)

(52) U.S. Cl.
CPC ........ *B60N 2/42763* (2013.01); *A47C 31/126* (2013.01); *A44B 11/2561* (2013.01); *B60R 22/26* (2013.01); *B60R 2022/1806* (2013.01)

(58) Field of Classification Search
CPC .............. B60N 2/42763; A47C 31/126; A44B 11/2561; B60R 22/26; B60R 2022/1806; B60R 21/015; B60R 2/01512; B60R 21/16; B60R 21/23
See application file for complete search history.

(56) References Cited

U.S. PATENT DOCUMENTS

| 7,354,106 | B2* | 4/2008 | Dennis .............. B60N 2/42754 |
| | | | 297/216.17 |
| 9,114,743 | B2* | 8/2015 | Komamura ........ B60N 2/42763 |
| 9,428,137 | B2* | 8/2016 | Lee ......................... B60N 2/42 |
| 9,505,367 | B2* | 11/2016 | Stancato ........... B60R 21/01546 |
| 9,527,408 | B2* | 12/2016 | Stancato .............. B60N 2/4279 |
| 2003/0067149 | A1* | 4/2003 | Gray ................. B60R 21/01516 |
| | | | 280/735 |

(Continued)

FOREIGN PATENT DOCUMENTS

| JP | H03-60149 U | 6/1991 |
| JP | 2009-113642 A | 5/2009 |

(Continued)

*Primary Examiner* — Philip F Gabler
(74) *Attorney, Agent, or Firm* — Oliff PLC

(57) ABSTRACT

A vehicle seat that includes: a seat cushion that is configured to be raised and lowered in a seat vertical direction; a buckle that is attachable to an attachment location that is not subject to the raising or lowering of the seat cushion, and that retains a tongue provided at an elongated belt shaped webbing, in a state in which in the webbing is worn over at least a pelvis area of the occupant; and a lifting device that is actuated, in a case in which a collision of a vehicle has been detected, so as to move the occupant, in a case in which the occupant is sitting on the seat cushion, toward an upper side of the seat at a location further toward a rear side of the seat than a central portion of the seat cushion in a front-rear direction of the seat.

2 Claims, 15 Drawing Sheets

(56) References Cited

U.S. PATENT DOCUMENTS

| | | | |
|---|---|---|---|
| 2007/0132214 A1* | 6/2007 | Suzuki | B60N 2/42718 |
| | | | 280/730.1 |
| 2011/0241400 A1 | 10/2011 | Ito et al. | |
| 2013/0082457 A1* | 4/2013 | Hashido | B60N 2/4279 |
| | | | 280/730.1 |
| 2014/0361520 A1 | 12/2014 | Hirako | |
| 2020/0039459 A1* | 2/2020 | Tanaka | B60N 2/4279 |

FOREIGN PATENT DOCUMENTS

| | | |
|---|---|---|
| JP | 2011-131698 A | 7/2011 |
| JP | 2011-131699 A | 7/2011 |
| JP | 2011-213149 A | 10/2011 |

* cited by examiner

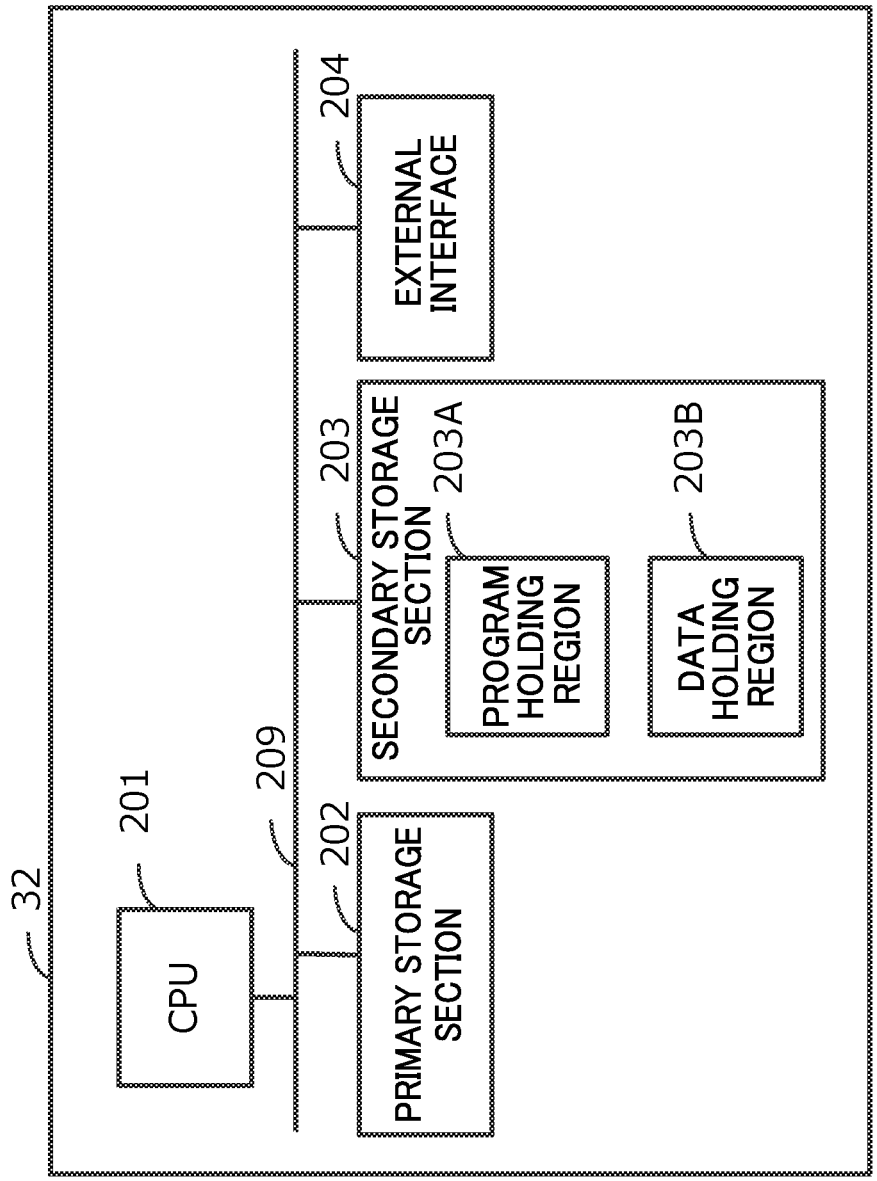

VEHICLE SEAT

CROSS-REFERENCE TO RELATED APPLICATION

This application is based on and claims priority under 35 USC 119 from Japanese Patent Application No. 2018-188561 filed on Oct. 3, 2018, the disclosure of which is incorporated by reference herein.

BACKGROUND

Technical Field

The present disclosure relates to a vehicle seat.

Related Art

Some vehicle seats include a seat cushion that is capable of being raised or lowered in a seat vertical direction with respect to a vehicle floor (see for example Japanese Patent Application Laid-Open (JP-A) No. 2011-213149). In a state in which a webbing of a seatbelt device is worn across the body of an occupant seated on the seat cushion, a tongue provided to the webbing is retained by a buckle. Such a buckle is, for example, sometimes attached to a location of the vehicle seat that does not follow the raising or lowering of the seat cushion, such that a seat vertical direction distance between the buckle and the pelvis area of the occupant varies with the raising or lowering of the seat cushion in such a buckle.

For example, in cases in which a seat cushion has a low vehicle vertical direction height from the floor, overlap between the webbing and the pelvis area of the occupant is sometimes reduced. However, this reduction in the overlap between the webbing and the pelvis area of the occupant is preferably kept small from the perspective of restraint of the pelvis area of the occupant using the webbing in a vehicle collision or the like.

SUMMARY

An aspect of the disclosure is a vehicle seat that includes: a seat cushion on which an occupant is able to sit, and that is configured to be raised and lowered in a seat vertical direction; a buckle that is attachable to an attachment location that is not subject to the raising or lowering of the seat cushion, and that retains a tongue provided at an elongated belt shaped webbing, in a state in which in the webbing is worn over at least a pelvis area of the occupant; and a lifting device that is actuated, in a case in which a collision or a predicted collision of a vehicle has been detected, so as to move the occupant, in a case in which the occupant is sitting on the seat cushion, toward an upper side of the seat at a location further toward a rear side of the seat than a central portion of the seat cushion in a front-rear direction of the seat.

BRIEF DESCRIPTION OF DRAWINGS

FIG. 15 is a block diagram illustrating configuration of a control device of a vehicle seat of a modified example.

DETAILED DESCRIPTION

Figure 1:
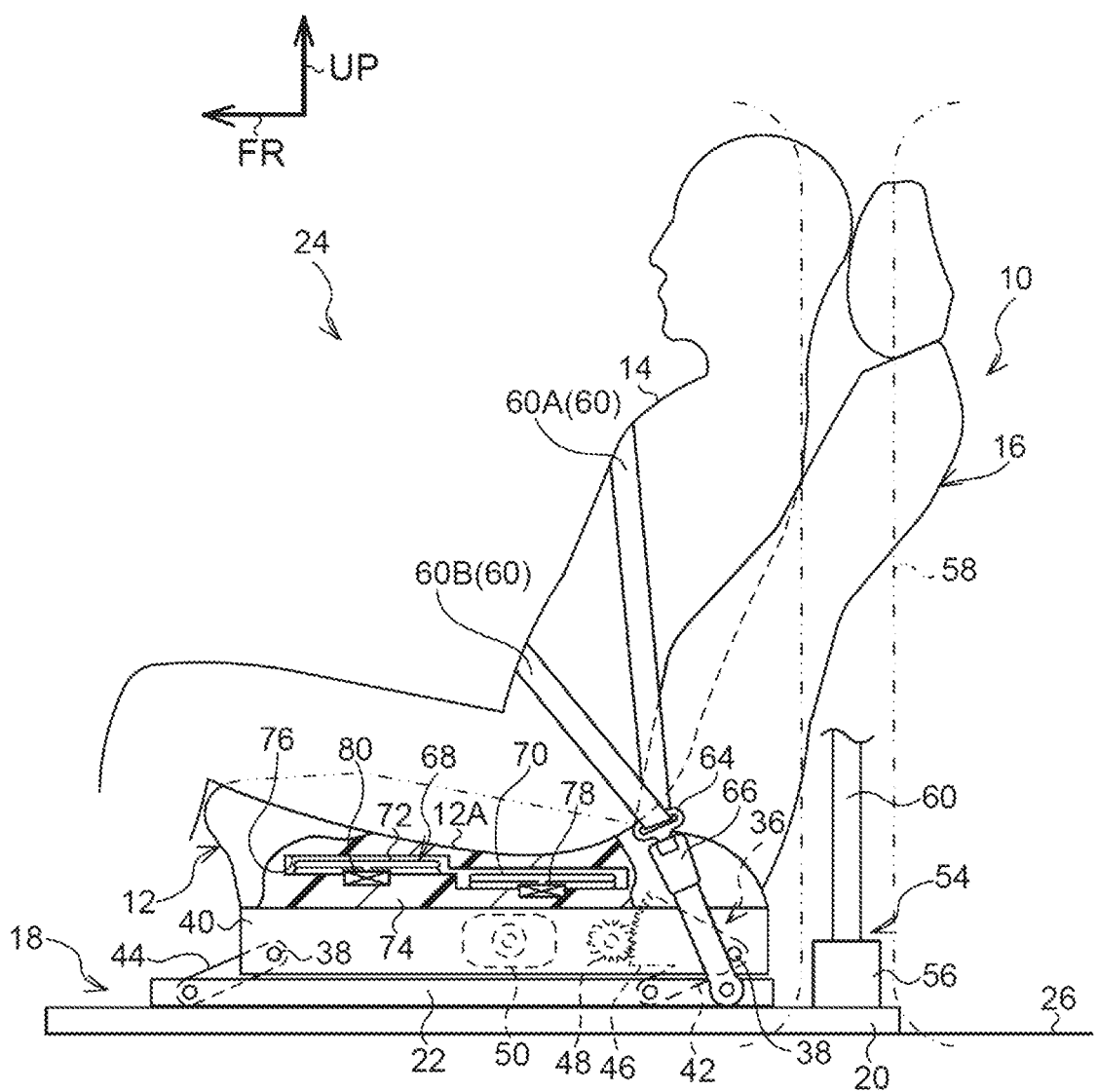
FIG. 1 is a side view from a vehicle width direction central side illustrating part of a vehicle seat according to a first exemplary embodiment in cross-section.

Explanation follows regarding exemplary embodiments of the present disclosure, with reference to FIG. 1 to FIG. 14. Note that in the drawings, the arrow FR indicates a front side of a vehicle seat 10 (seat front side), the arrow UP indicates a seat upper side, and the arrow LH indicates a seat left side.

In the description of later embodiments, configurations that are basically the same as those already described in an earlier exemplary embodiment are allocated the same reference numerals, and detailed description thereof is omitted.

Configuration of First Exemplary Embodiment

As illustrated in FIG. 1, a vehicle seat 10 according to a first exemplary embodiment includes a seat cushion 12 configuring a seat unit. An occupant 14 is able to sit on a seat face 12A, this being a seat upper side face of the seat cushion 12. A seatback 16 configuring a backrest is provided at the seat rear side of the seat cushion 12. A shaft with its length along a seat width direction is provided at the seat lower side of the seatback 16. The seatback 16 is capable of pivoting about the shaft in a seat front-rear direction with respect to the seat cushion 12.

The vehicle seat 10 also includes a slide mechanism 18. The slide mechanism 18 includes a pair of guide rails 20. The length direction of the guide rails 20 runs along a vehicle front-rear direction (the arrow FR direction in FIG. 1 and the opposite direction thereto). The guide rails 20 are fixed to a floor 26 of a vehicle 24 at the seat lower side of two seat width direction side end portions of the seat cushion 12. The slide mechanism 18 also includes a pair of movable rails 22. The length direction of the movable rails 22 runs along the vehicle front-rear direction. The movable rails 22 are provided at the seat lower side of the two seat width direction side end portions of the seat cushion 12. The movable rails 22 engage with the guide rails 20 such that the movable rails 22 are capable of sliding along the vehicle front-rear direction guided by the guide rails 20.

Figure 3:
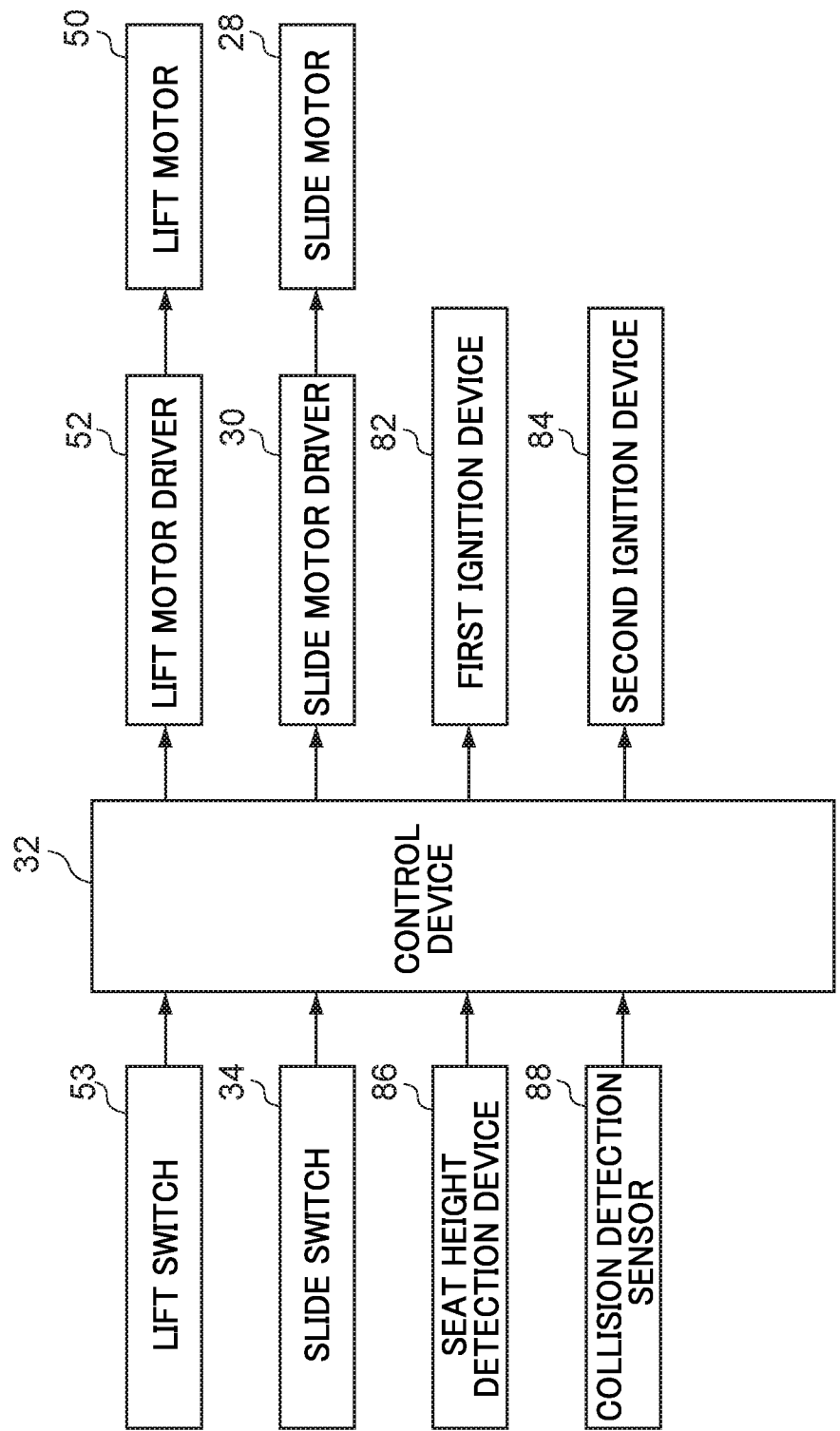
FIG. 3 is a block diagram illustrating control of a vehicle seat according to the first exemplary embodiment.
Figure 4:
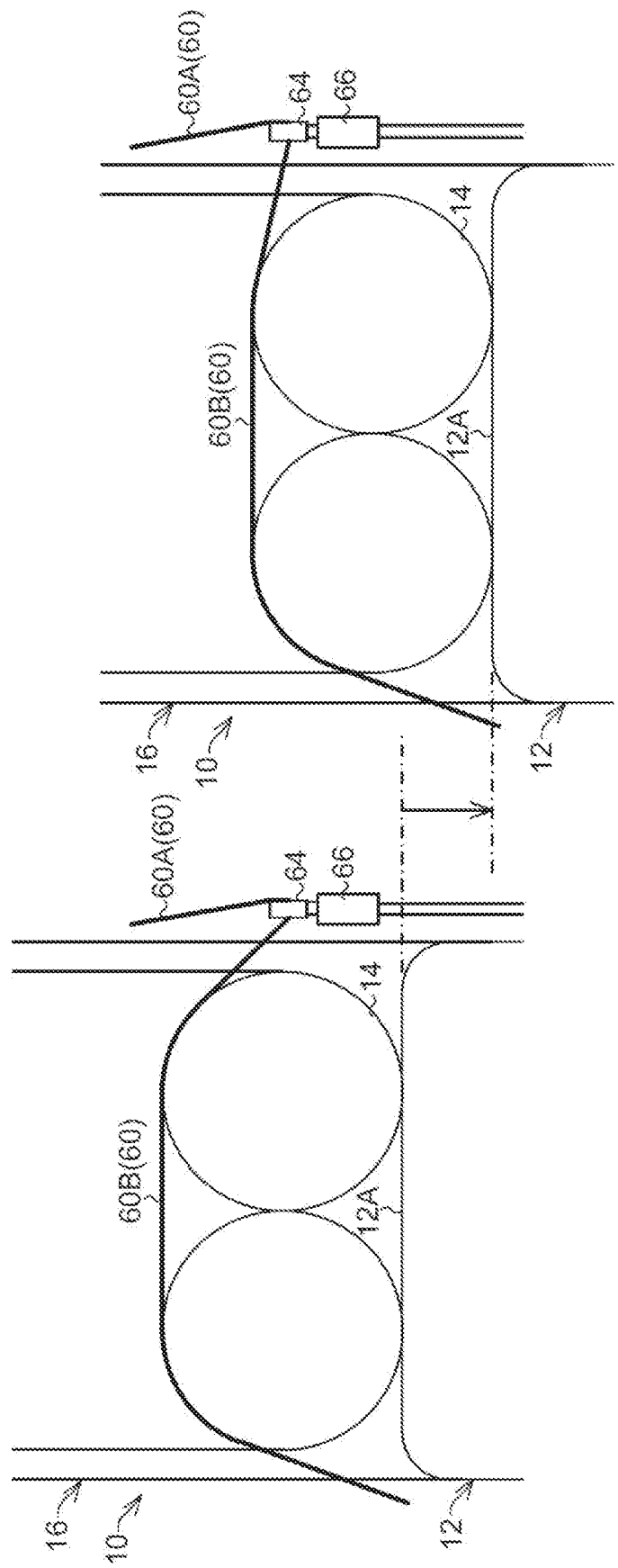
FIG. 4(A) is a front view illustrating a positional relationship between the body of an occupant and a buckle prior to a seat cushion being lowered and FIG. 4(B) is a front view illustrating a positional relationship between the body of an occupant and a buckle after a seat cushion has been lowered.
Figure 5:
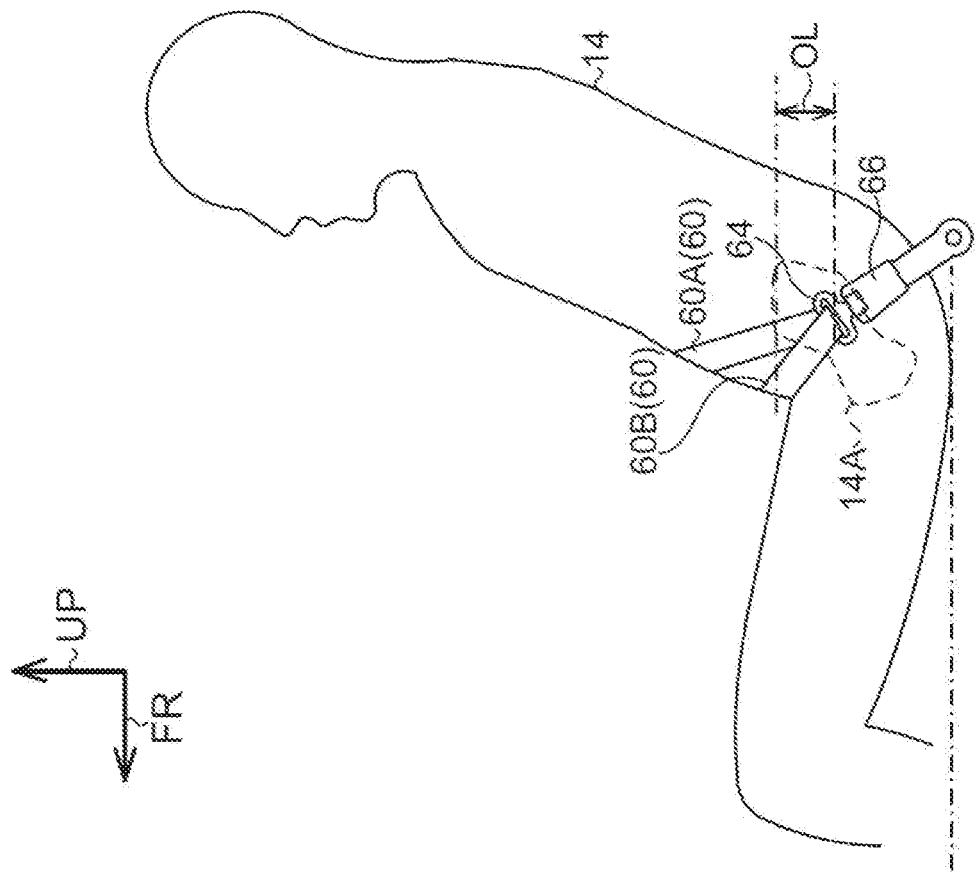
FIG. 5(A) is a side view illustrating a positional relationship between the body of an occupant and a buckle prior to a seat cushion being lowered and FIG. 5(B) is a side view illustrating a positional relationship between the body of an occupant and a buckle and a change in lap webbing overlap after a seat cushion has been lowered.

As illustrated in FIG. 3, the slide mechanism 18 also includes a slide motor 28. For example, the slide motor 28 is provided between the pair of movable rails 22, and the movable rails 22 are moved in the vehicle front-rear direction by drive force from the slide motor 28. The slide motor 28 is electrically connected to a battery mounted to the vehicle 24 through a slide motor driver 30, and is also electrically connected to a control device 32.

The control device 32 is electrically connected to a slide switch 34. When the slide switch 34 is operated, a slide operation signal, this being an electrical signal, is output from the slide switch 34, and the slide operation signal is input to the control device 32. When the slide operation signal is input to the control device 32, a slide drive control signal, this being an electrical signal based on the slide operation signal, is output from the control device 32. The slide drive control signal output from the control device 32 is input to the slide motor driver 30, and the slide motor driver 30 controls driving of the slide motor 28 based on the input slide drive control signal.

As illustrated in FIG. 1, the vehicle seat 10 also includes a lift mechanism 36. The lift mechanism 36 includes a pair of rods 38. One of the pair of rods 38 is provided at the seat rear side of a cushion frame 40 of the seat cushion 12, and the other of the rods 38 is provided at the seat front side of the cushion frame 40. The length direction of the rods 38 runs along the seat width direction, and the two length direction end portions of each of the rods 38 are supported by the cushion frame 40.

The lift mechanism 36 also includes a drive link 42 and three following links 44, serving as raising-lowering members. The drive link 42 is provided at the seat rear-left side of the cushion frame 40, and one length direction end portion of the drive link 42 is rotatably supported by the seat rear side rod 38. One of the three following links 44 is provided at the seat front-left side of the cushion frame 40, and is rotatably supported by the seat front side rod 38. Other length direction end portions of the drive link 42 and the seat front-left side following link 44 are coupled to the seat left side movable rail 22 of the pair of movable rails 22, and are each capable of pivoting with respect to the seat left side movable rail 22 about an axis having an axial direction along the seat width direction.

The other two out of the three following links 44 are respectively provided at the seat rear-right side and the seat front-right side of the cushion frame 40. The following link 44 on the seat rear-right side of the cushion frame 40 is rotatably supported by the seat rear side rod 38, and the following link 44 on the seat front-right side of the cushion frame 40 is rotatably supported by the seat front side rod 38. Other length direction end portions of the seat right side following links 44 are coupled to the seat right side movable rail 22 of the pair of movable rails 22, and are each capable of pivoting with respect to the seat right side movable rail 22 about an axis having an axial direction along the seat width direction.

A sector gear 46 is formed to the drive link 42. Outer teeth are formed at a seat front side end portion of the sector gear 46. The sector gear 46 corresponds to part of an external spur gear that is coaxial to the seat rear side rod 38. A pinion 48 meshes with the sector gear 46. When rotation of the pinion 48 is transmitted to the sector gear 46, the drive link 42 is pivoted about a location where the drive link 42 is coupled to the corresponding movable rail 22. The seat rear side rod 38 is pivoted in a seat vertical direction by the pivoting of the drive link 42, such that the cushion frame 40 of the seat cushion 12 is raised or lowered so as to pivot in the seat vertical direction. The three following links 44 described above follow by pivoting about locations coupled to corresponding the movable rails 22 accompanying the raising or lowering of the cushion frame 40.

The pinion 48 is coupled to an output shaft of a lift motor 50 through a speed reduction mechanism such as a speed reduction gear train, or through a drive force transmission mechanism, and the pinion 48 is rotated by drive force from the lift motor 50.

As illustrated in FIG. 3, the lift motor 50 is electrically connected to the control device 32 through a lift motor driver 52. The control device 32 is electrically connected to a lift switch 53. When the lift switch 53 is operated, a lift operation signal, this being an electrical signal, is output from the lift switch 53, and the lift operation signal is input to the control device 32. When the lift operation signal is input to the control device 32, a lift drive control signal, this being an electrical signal based on the lift operation signal, is output from the control device 32. The lift drive control signal output from the control device 32 is input to the lift motor driver 52, and the lift motor driver 52 controls driving of the lift motor 50 based on the input lift drive control signal.

The vehicle 24 in which the vehicle seat 10 is installed includes a seatbelt device 54. The seatbelt device 54 includes a retractor 56. The retractor 56 is fixed to the vehicle body at a vehicle lower side (a side in the opposite direction to the arrow UP in FIG. 1) of a center pillar 58 of the vehicle 24. The retractor 56 includes a take-up shaft. A length direction base end portion of an elongated belt shaped webbing 60 is anchored to the take-up shaft, and the webbing 60 is taken up onto the take-up shaft from the length direction base end side.

A length direction leading end side of the webbing 60 is pulled out toward a vehicle upper side along the center pillar 58, passed through a slit in a through-anchor provided at the vehicle upper side of the retractor 56, and folded back toward the vehicle lower side. A length direction leading end portion of the webbing 60 is anchored to an anchor member 62 (see FIG. 10). The anchor member 62 is fixed to the seat right side movable rail 22. A tongue 64 is provided to a portion of the webbing 60 between the through-anchor and the anchor member 62.

The seatbelt device 54 also includes a buckle 66. The buckle 66 is provided at the seat left side of the seat cushion 12 and is attached to the seat left side movable rail 22 (namely, in the present exemplary embodiment, the seat left side movable rail 22 configures an attachment location of the buckle 66). Thus, the buckle 66 is not raised or lowered when the seat cushion 12 is raised or lowered by the lift mechanism 36. The tongue 64 is capable of engaging with the buckle 66. The tongue 64 is retained by the buckle 66 when the tongue 64 engages with the buckle 66. In a state in which the webbing 60 has been wrapped across the body the occupant 14, the tongue 64 is retained by the buckle 66 so as to place the body of the occupant 14 in a state restrained by the webbing 60.

In this restraining state, a portion of the webbing 60 between the through-anchor and the tongue 64 configures a shoulder webbing 60A, and the body of the occupant 14 is restrained by the shoulder webbing 60A over an area spanning from the shoulder on the vehicle width direction outer side to the vicinity of the chest. Moreover, in this restraining state, a portion of the webbing 60 between the tongue 64 and the anchor member 62 configures a lap webbing 60B. The lap webbing 60B restrains the pelvis area (the pelvis 14A, see FIG. 5(A)) of the body of the occupant 14 from the vehicle upper-front side.

The vehicle seat 10 includes an airbag device 68 serving as a lifting device. The airbag device 68 includes a first bag body 70 and a second bag body 72, each serving as a bag body. The first bag body 70 and the second bag body 72 are provided inside a bag body placement section 76 formed inside a cushioning material 74 of the seat cushion 12. The first bag body 70 is disposed further toward the seat rear side than a seat front-rear direction central portion of the seat cushion 12 (the seat front-rear direction center of the seat cushion 12 and the vicinity thereof), and a placement position of the first bag body 70 is for example at the seat lower side of the pelvis area of the occupant 14 seated on the seat cushion 12. The second bag body 72 is disposed further toward the seat front side than the seat front-rear direction central portion of the seat cushion 12, and a placement position of the second bag body 72 is for example at the seat lower side of the thighs (lower limbs) of the occupant 14 seated on the seat cushion 12.

The airbag device 68 also includes a first inflator 78 and a second inflator 80, each serving as a gas generating device. The first inflator 78 is a disk type inflator, and is provided inside the seat cushion 12 in a state in which a portion (a seat upper side portion) of the first inflator 78 is inserted inside the first bag body 70. A gas generating agent, a first ignition device 82 (see FIG. 3) to cause the gas generating agent to combust, and the like are provided in the first inflator 78. The gas generating agent combusts on actuation of the first ignition device 82. Combustion of the gas generating agent instantaneously generates a large amount of gas.

The gas generated by combustion of the gas generating agent is supplied into the first bag body 70, which is in a folded state, and the first bag body 70 is inflated by the pressure of the gas. The inflated first bag body 70 presses a seat upper side portion of the bag body placement section 76 upward toward the seat upper side (see FIG. 2). Thus, at the seat rear side of the seat front-rear direction central portion of the seat cushion 12, a portion of the seat cushion 12 located at the seat upper side of the bag body placement section 76 is moved toward the seat upper side together with a portion of the seat face 12A of the seat cushion 12 located further toward the seat rear side than a seat front-rear direction central portion of the seat face 12A.

The amount by which the seat face 12A of the seat cushion 12 is moved toward the seat upper side by inflation of the first bag body 70 is, for example, set so as to be the same as the size of a stroke between an upper extent and a lower extent of seat vertical direction movement of the seat cushion 12 caused by the lift mechanism 36.

The second inflator 80 is a disk type inflator, and is provided inside the seat cushion 12 in a state in which a portion (a seat upper side portion) of the second inflator 80 is inserted inside the second bag body 72. A gas generating agent, a second ignition device 84 (see FIG. 3) to cause the gas generating agent to combust, and the like are provided in the second inflator 80. The gas generating agent combusts on actuation of the second ignition device 84. Combustion of the gas generating agent instantaneously generates a large amount of gas.

The gas generated by combustion of the gas generating agent is supplied into the second bag body 72, which is in a folded state, and the second bag body 72 is inflated by the pressure of the gas. The inflated second bag body 72 presses the seat upper side portion of the bag body placement section 76 upward toward the seat upper side (see FIG. 2). Thus, at the seat front side of the seat front-rear direction central portion of the seat cushion 12, a portion of the seat cushion 12 located at the seat upper side of the bag body placement section 76 is moved toward the seat upper side together with a portion of the seat face 12A of the seat cushion 12 located further toward the seat front side than the seat front-rear direction central portion of the seat face 12A.

An inflation amount of the second bag body 72 toward the seat upper side is greater than that of the first bag body 70. Thus, a movement amount toward the vehicle upper side of the portion of the seat face 12A of the seat cushion 12 further toward the seat front side than the seat front-rear direction central portion due to inflation of the second bag body 72 is greater than a movement amount toward the vehicle upper side of the portion of the seat face 12A of the seat cushion 12 further toward the seat rear side than the seat front-rear direction central portion due to inflation of the first bag body 70.

As illustrated in FIG. 3, the control device 32 is electrically connected to a seat height detection device 86. The seat height detection device 86 is for example configured by a rotary encoder that detects a rotation position of the output shaft of the lift motor 50. As described above, drive force from the lift motor 50 is transmitted to the drive link 42, and the seat cushion 12 is raised or lowered by pivoting of the drive link 42. A seat vertical direction position (height) of the seat cushion 12 can thus be detected indirectly by detecting the rotation position of the output shaft of the lift motor 50.

A seat height detection signal, this being an electrical signal corresponding to the rotation position of the output shaft of the lift motor 50 (namely, the height of the seat cushion 12), is output from the seat height detection device 86. The seat height detection signal output from the seat height detection device 86 is input to the control device 32.

The control device 32 is also electrically connected to a collision detection sensor 88. The collision detection sensor 88 is for example provided at a vehicle front side end portion of the vehicle, and detects acceleration (deceleration) of the vehicle 24 when the vehicle 24 collides with an obstacle. When the collision detection sensor 88 detects a change in acceleration due to a collision such as a head-on collision of the vehicle 24, a collision detection signal, this being an electrical signal, is output from the collision detection sensor 88.

When the collision detection signal output from the collision detection sensor 88 is input to the control device 32, the control device 32 output a first ignition signal to actuate the first ignition device 82 of the first inflator 78, and a second ignition signal to actuate the second ignition device 84 of the second inflator 80. The first inflator 78 and the second inflator 80 are thereby actuated in a vehicle collision, and the first bag body 70 and the second bag body 72 are both inflated.

Operation and Advantageous Effects of First Exemplary Embodiment

Explanation follows regarding operation and advantageous effects of the present exemplary embodiment.

In the vehicle seat 10, when the lift switch 53 is operated by the occupant 14 seated on the seat cushion 12, a lift operation signal output from the lift switch 53 is input to the control device 32. The control device 32 outputs a lift drive control signal based on the input lift operation signal, and the lift drive control signal is input to the lift motor driver 52. The lift motor driver 52 drives the lift motor 50 based on the lift drive control signal, thereby raising or lowering the seat cushion 12 in a vehicle vertical direction.

A seat height detection signal corresponding to the height of the seat cushion 12 in this state is output from the seat height detection device 86. The seat height detection signal is input to the control device 32. Based on a signal level (voltage, for example) of the seat height detection signal, the control device 32 determines whether or not the seat cushion 12 has reached a lower limit of a vehicle vertical direction movable range of the lift mechanism 36. When the control device 32 determines that the seat cushion 12 has reached the lower limit of the vehicle vertical direction movable range of the lift mechanism 36, a seat height condition, this being one inflator actuation condition, is satisfied in the control device 32.

When the vehicle 24 is in a head-on collision with an obstacle, a collision detection signal corresponding to the acceleration (deceleration) of the vehicle 24 at this point in time is output from the collision detection sensor 88 and input to the control device 32. The control device 32 determines that a head-on collision of the vehicle 24 has occurred based on the collision detection signal at this point in time. If the seat height condition, this being one inflator actuation condition, is satisfied in this state, the control device 32 outputs a first ignition signal in order to actuate the first ignition device 82 of the first inflator 78 and a second ignition signal in order to actuate the second ignition device 84 of the second inflator 80.

When the first ignition signal output from the control device 32 is input to the first ignition device 82 of the first inflator 78, the first ignition device 82 is actuated, causing the gas generating agent provided in the first inflator 78 to combust. When the gas generating agent in the first inflator 78 combusts and a large amount of gas is instantaneously generated in the first inflator 78, this gas is supplied into the first bag body 70. The first bag body 70 inflates under the pressure of the gas supplied therein. A seat upper side portion of the bag body placement section 76, located at a portion of the bag body placement section 76 formed inside the cushioning material 74 of the seat cushion 12 that faces the first bag body 70 in the seat vertical direction, is pressed upward by the inflating first bag body 70.

Figure 2:
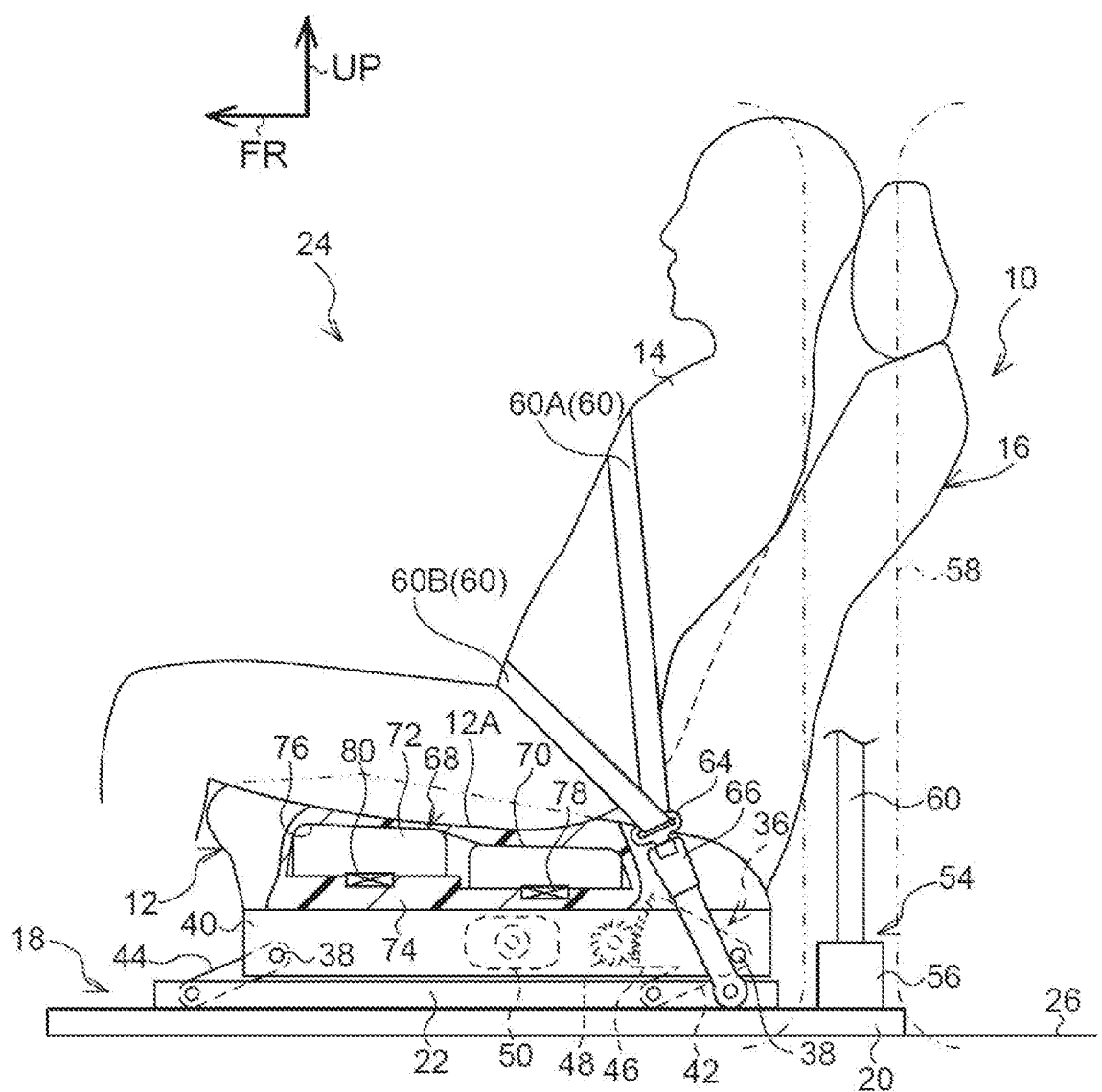
FIG. 2 is a side view corresponding to FIG. 1, illustrating an inflated state of a first bag body and a second bag body.

Thus, as illustrated in FIG. 2, further toward the seat rear side than the seat front-rear direction central portion of the seat cushion 12, a portion of the seat cushion 12 at the seat upper side of the bag body placement section 76, moves toward the seat upper side accompanying the portion of the seat face 12A of the seat cushion 12 further toward the seat rear side than the seat front-rear direction central portion. The portion further toward the seat rear side than the seat front-rear direction central portion of the seat face 12A is positioned at the seat lower side of the occupant 14. Thus, the movement toward the seat upper side of the portion further toward the seat rear side than the seat front-rear direction central portion of the seat face 12A of the seat cushion 12 moves the pelvis area of the occupant 14 toward the seat upper side.

Note that the buckle 66 that retains the tongue 64 provided to the webbing 60 is attached to the seat left side movable rail 22 that configures the slide mechanism 18. The drive link 42 of the lift mechanism 36 pivots about the portion coupled to the seat left side movable rail 22, such that the cushion frame 40 of the seat cushion 12 is raised or lowered with respect to the movable rails 22. Thus, the buckle 66 is not raised when the first bag body 70 provided inside the seat cushion 12 inflates and the body of the occupant 14 is moved toward the vehicle upper side together with the seat face 12A of the seat cushion 12 as described above. Thus, when the body of the occupant 14 moves toward the seat upper side due to inflation of the first bag body 70, the buckle 66 moves toward the seat lower side relative to the body of the occupant 14.

As illustrated in FIG. 4(B) by way of contrast to FIG. 4(A), when the seat cushion 12 is greatly lowered and the buckle 66 is greatly raised relative to the seat cushion 12, a webbing fold-back position at the tongue 64 becomes close to the pelvis area of the occupant 14 in the seat vertical direction, or the webbing fold-back position at the tongue 64 is positioned further toward the seat upper side than the pelvis area of the occupant 14. In such a state, a seat left side portion of the lap webbing 60B sometimes lifts up from (is positioned at the seat upper side of) the pelvis area of the occupant 14 at the seat left side of the body of the occupant 14 (the side of the placement position of the buckle 66 with respect to the occupant 14). There is a possibility that restraint performance of the body of the occupant 14 by the lap webbing 60B might be reduced in such a state.

As illustrated in FIG. 5(B) by way of contrast to FIG. 5(A), when the webbing fold-back position at the tongue 64 becomes close to the pelvis area of the occupant 14 in the seat vertical direction, or the webbing fold-back position at the tongue 64 is positioned further toward the seat upper side than the pelvis area of the occupant 14, an overlap OL between the pelvis area of the occupant 14 and the lap webbing 60B sometimes becomes smaller.

Note that when the buckle 66 moves toward the seat lower side relative to the body of the occupant 14 as described above, the lap webbing 60B attempts to move toward the seat lower side relative to the body of the occupant 14 so as to follow the body of the occupant 14. When the lap webbing 60B moves relative to the body of the occupant 14 in this manner, the overlap OL between the lap webbing 60B and the pelvis area of the occupant 14 increases (namely, the state illustrated in FIG. 5(B) transitions to the state illustrated in FIG. 5(A) due to the relative movement of the lap webbing 60B).

Thus, in the vehicle seat 10, a reduction in the overlap OL between the lap webbing 60B and the pelvis area of occupant 14 in a vehicle collision can be suppressed, and therefore a reduction in the restraint performance of the pelvis area of the occupant 14 by the lap webbing 60B in a vehicle collision can be suppressed.

When a second ignition signal output from the control device 32 is input to the second ignition device 84 of the second inflator 80, the second ignition device 84 is actuated, causing the gas generating agent provided in the second inflator 80 to combust. When the gas generating agent in the second inflator 80 combusts and a large amount of gas is instantaneously generated in the second inflator 80, this gas is supplied into the second bag body 72. The second bag body 72 inflates under the pressure of the gas supplied therein. A seat upper side portion of the bag body placement section 76, located at a portion of the bag body placement section 76 formed inside the cushioning material 74 of the seat cushion 12 that faces the second bag body 72 in the seat vertical direction, is pressed upward by the inflating second bag body 72.

Thus, as illustrated in FIG. 2, further toward the seat front side than the seat front-rear direction central portion of the seat cushion 12, a portion of the seat cushion 12 at the seat upper side of the bag body placement section 76 moves toward the seat upper side accompanying the portion of the seat face 12A of the seat cushion 12 further toward the seat front side than the seat front-rear direction central portion. The portion of the seat face 12A further toward the seat front side than the seat front-rear direction central portion is positioned at the seat lower side of the occupant 14. Thus, the movement toward the seat upper side of the portion further toward the seat front side than the seat front-rear direction central portion of the seat face 12A of the seat cushion 12 moves the lower limbs of the occupant 14 toward the seat upper side.

When the lower limbs of the occupant 14 are moved toward the seat upper side in this manner, movement, primarily of the lower limbs of the occupant 14, toward the seat front side under inertia is suppressed. This enables the occurrence of the submarining phenomenon, in which the occupant 14 moves toward the seat front side due to sliding under the seat lower side of the lap webbing 60B, to be suppressed, enabling the body (pelvis area) of the occupant 14 to be effectively restrained by the lap webbing 60B.

Second Exemplary Embodiment

Figure 6:
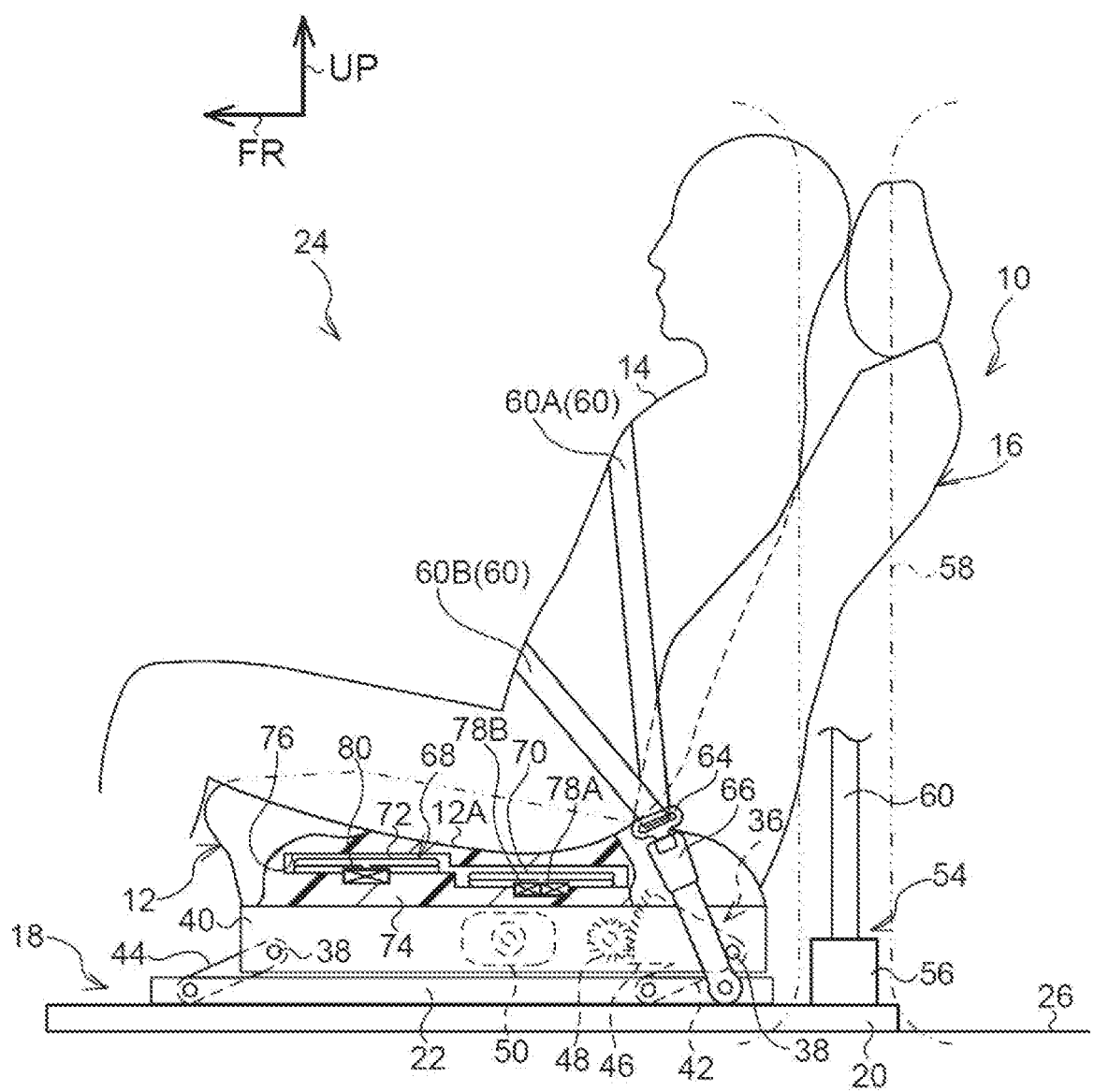
FIG. 6 is a side view from a vehicle width direction central side illustrating part of a vehicle seat according to a second exemplary embodiment in cross-section.

As illustrated in FIG. 6, a vehicle seat 10 according to a second exemplary embodiment includes two first inflators, these being a first inflator 78A and a first inflator 78B, instead of the first inflator 78 of the first exemplary embodiment. Each of the first inflators 78A, 78B is a disk type inflator, and is provided inside the seat cushion 12 in a state in which a portion (a seat upper side portion) of each of the first inflators 78A, 78B is inserted inside the first bag body 70. A gas generating agent is provided inside each of the first inflators 78A, 78B. A first ignition device 82A (see FIG. 8) to cause the gas generating agent to combust is provided in the first inflator 78A, and a first ignition device 82B (see FIG. 8) to cause the gas generating agent to combust is provided in the first inflator 78B.

Note that the output (the amount of gas produced when the gas generating agent combusts to generate gas) of each of the first inflators 78A, 78B is lower than the output of the first inflator 78 of the first exemplary embodiment. For example, the individual outputs of the first inflators 78A, 78B are set such that the sum of the output of the first inflator 78A and the output of the first inflator 78B is substantially the same as the output of the first inflator 78 of the first exemplary embodiment.

Figure 8:
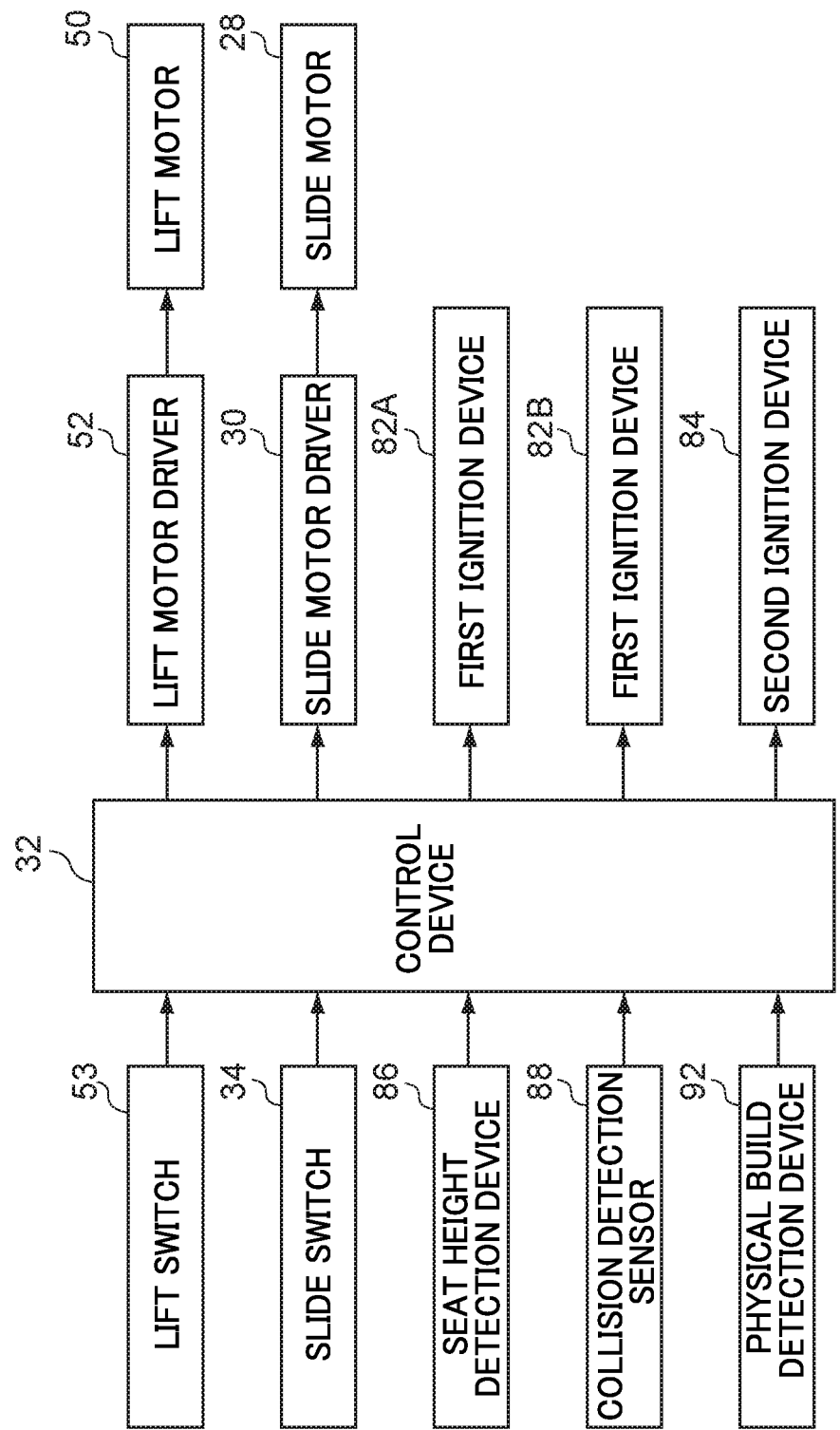
FIG. 8 is a block diagram illustrating control of a vehicle seat according to the second exemplary embodiment.

As illustrated in FIG. 8, the present exemplary embodiment includes a physical build detection device 92. The physical build detection device 92 is for example configured including a load sensor provided inside the seat cushion 12, and detects a load acting on the seat cushion 12 from the vehicle upper side. The physical build detection device 92 outputs a load detection signal based on the size of the load acting on the seat cushion 12. The load detection signal output from the physical build detection device 92 is input to the control device 32. The control device 32 is preset with a reference value for comparison with the input load detection signal. The reference value is for example a value equivalent to the load detection signal that would be output from the physical build detection device 92 if a human dummy of an adult female in the 5$^{th}$ percentile (AF05) (height 145 cm, weight 45 kg) were seated on the seat cushion 12.

Note that in the present exemplary embodiment, a load sensor is applied as the physical build detection device 92. However, for example, the physical build detection device 92 may be configured such that the physical build of the occupant 14 is detected based on an image captured by a camera mounted inside the vehicle cabin. Alternatively, the physical build detection device 92 may be configured so as to detect a vehicle front-rear direction position of the vehicle seat 10 and determine an approximate physical build of the occupant 14 based on the detection result, or may be configured so as to determine an approximate physical build of the occupant 14 based on an amount of the webbing 60 pulled out from the retractor 56. Namely, there is no limitation to a particular configuration, as long as the physical build detection device is able to detect the physical build of the occupant 14.

In a head-on collision of the vehicle 24, the control device 32 actuates both the first ignition device 82A of the first inflator 78A and the first ignition device 82B of the first inflator 78B in cases in which the result of the comparison between the reference value and the input load detection signal by the control device 32 is that the input load detection signal is the reference value or greater. In contrast thereto, the control device 32 actuates the first ignition device 82A of the first inflator 78A, but does not actuate the first ignition device 82B of the first inflator 78B in a head-on collision of the vehicle 24 in cases in which the input load detection signal is less than the reference value.

Note that as described above, the output of the first inflator 78A is lower than the output of the first inflator 78 of the first exemplary embodiment. Thus, the amount of gas supplied into the first bag body 70 from the first inflator 78A in cases in which only the first inflator 78A is actuated is smaller than the amount of gas supplied into the first bag body 70 from the first inflator 78 in cases in which the first inflator 78 of the first exemplary embodiment is actuated.

Figure 7:
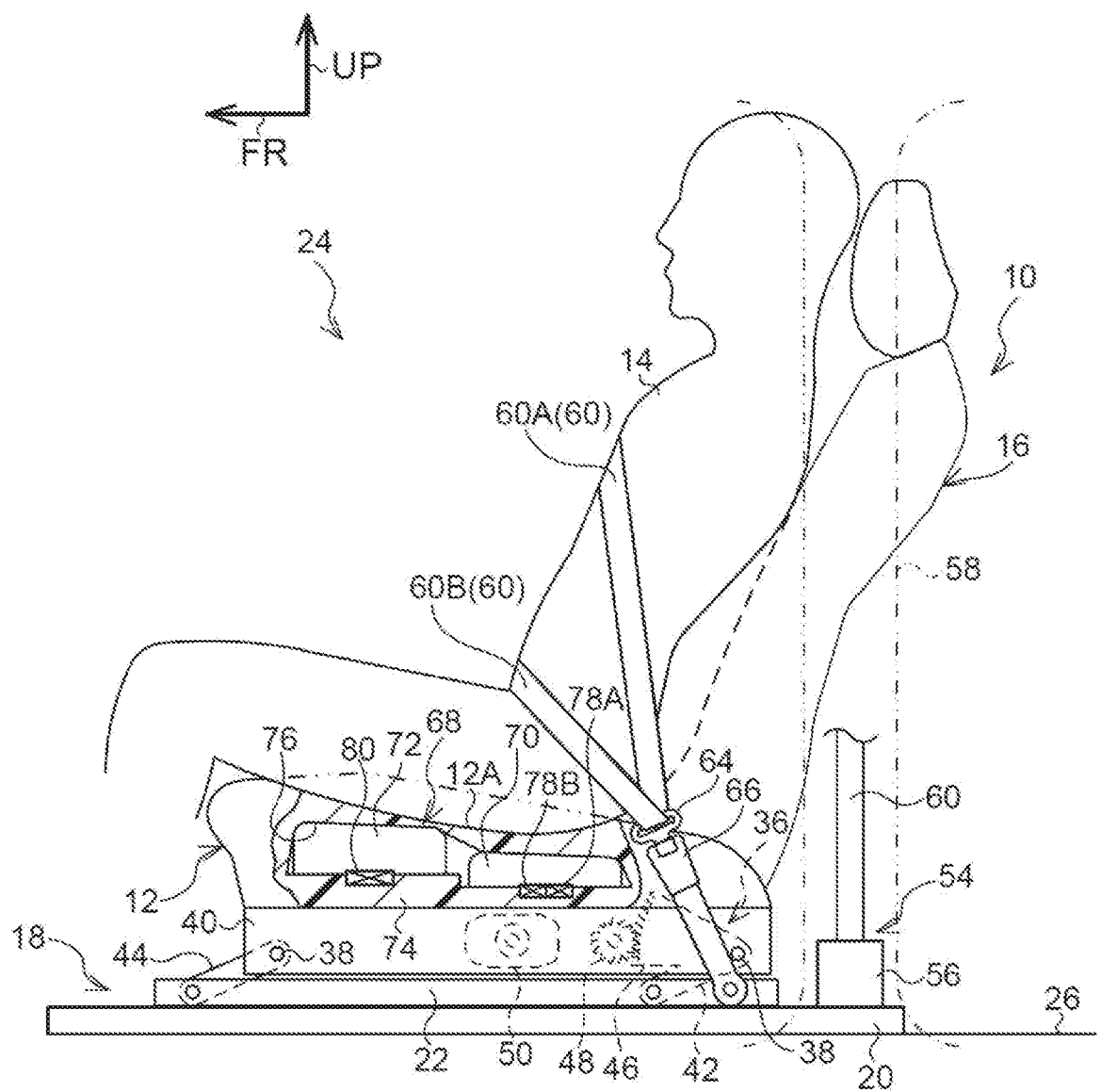
FIG. 7 is a side view corresponding to FIG. 6, illustrating an inflated state of a first bag body and a second bag body in partial cross-section from the vehicle width direction central side.

Thus, the first bag body 70 inflates less in cases in which only the first inflator 78A is actuated than in cases in which the first inflator 78 is actuated. Accordingly, as illustrated in FIG. 7, in cases in which only the first inflator 78A is actuated, a movement amount of the seat face 12A toward the seat upper side at a portion further toward the seat rear side than the seat front-rear direction central portion of the seat cushion 12, namely, the movement amount of the pelvis area of the occupant 14 toward the seat upper side, is smaller than a movement amount of the pelvis area of the occupant 14 toward the seat upper side in cases in which the first inflator 78 is actuated.

Thus, in cases in which the physical build of the occupant 14 seated in the seat cushion 12 is less than a predetermined size, namely, in cases in which the occupant 14 has a small build, the movement amount of the pelvis area of the occupant 14 toward the seat upper side in a vehicle head-on collision can be reduced. This enables the seat vertical direction height of the lower limbs of any occupant 14 to be set approximately the same, regardless of the physical build of the occupant 14. This enables the lower limbs (knees) of the occupant 14 to be positioned within a preset range with respect to an instrument panel or knee airbag device installed in the vehicle 24.

Configuration of Third Exemplary Embodiment

Figure 9:
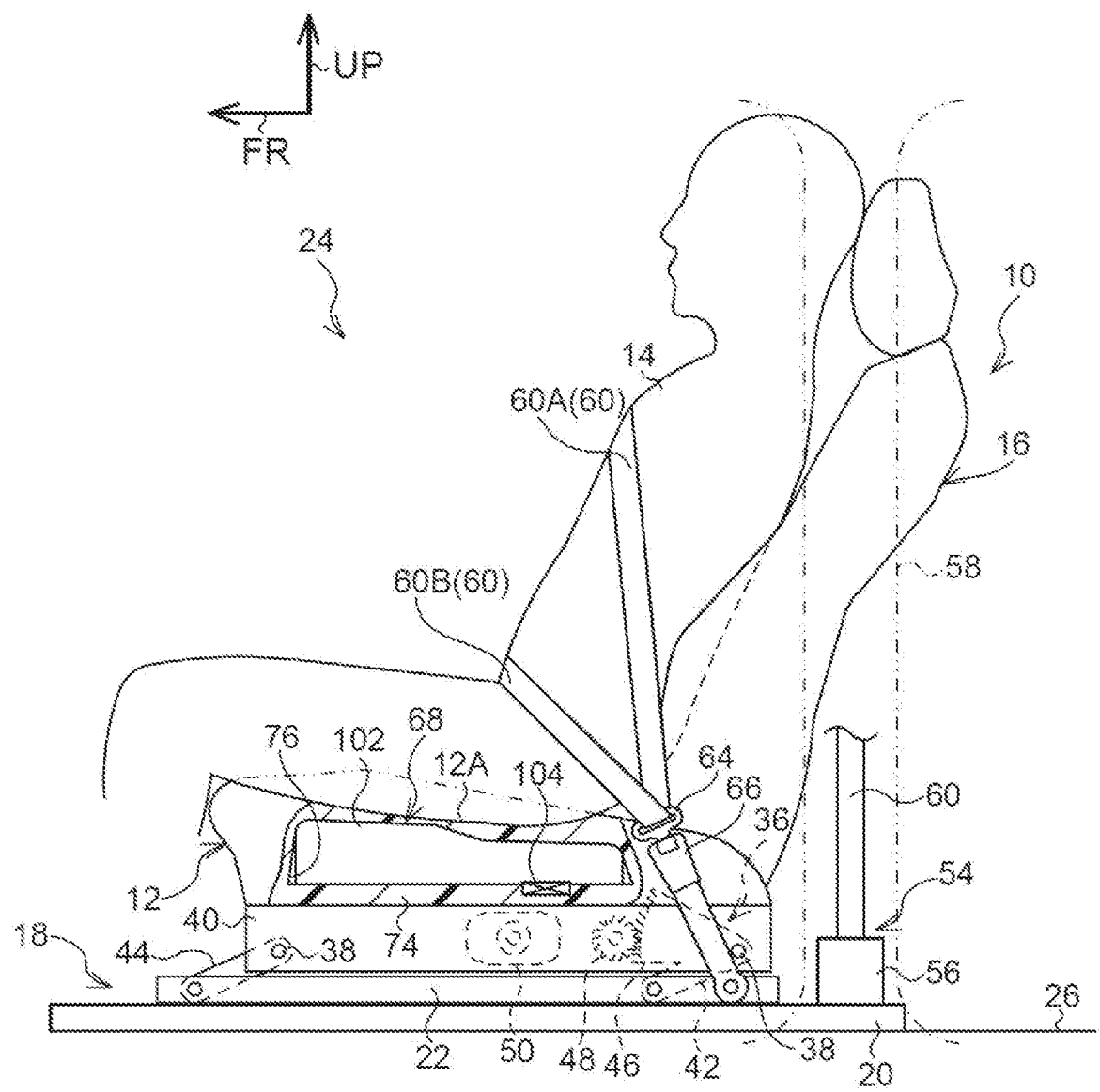
FIG. 9 is a side view illustrating a bag body of a vehicle seat according to a third exemplary embodiment in an inflated state.

The first exemplary embodiment includes the first bag body 70 and the second bag body 72. In contrast thereto, as illustrated in FIG. 9, a third exemplary embodiment includes a single bag body 102. A seat front-rear direction installation range of the bag body 102 inside the seat cushion 12 is equivalent to the combined installation ranges of the first bag body 70 and the second bag body 72 in the first exemplary embodiment.

As illustrated in FIG. 9, the present exemplary embodiment includes the single bag body 102 in contrast to the first exemplary embodiment, which includes the first bag body 70 and the second bag body 72. The seat front-rear direction installation range of the bag body 102 inside the seat cushion 12 is equivalent to the combined installation ranges of the first bag body 70 and the second bag body 72 in the first exemplary embodiment. Thus, a portion of the bag body 102 located further toward the seat rear side than a seat front-rear direction central portion of the bag body 102 is positioned at the seat lower side of the pelvis area of an occupant 14 seated on the seat cushion 12, similarly to the first bag body 70 of the first exemplary embodiment. A portion of the bag body 102 at the seat front side of the seat front-rear direction central portion of the bag body 102 is positioned at the seat lower side of the lower limbs of the occupant 14 seated on the seat cushion 12, similarly to the second bag body 72 of the first exemplary embodiment.

The present exemplary embodiment includes a single inflator 104. The inflator 104 is a disk type inflator, and is provided inside the seat cushion 12 in a state in which a portion (a seat upper side portion) of the inflator 104 is inserted inside the bag body 102. The bag body 102 is inflated by actuation of the single inflator 104. An inflated shape-restricting member such as a tether is provided inside the bag body 102. An inflation amount toward the seat upper side of a portion of the bag body 102 located further toward the seat rear side than the seat front-rear direction central portion of the bag body 102 is smaller than that of a portion of the bag body 102 located further toward the seat front side than the seat front-rear direction central portion of the bag body 102 due to the provision of the inflated shape-restricting member.

An inflated state of the bag body 102 of the present exemplary embodiment with the above configuration is substantially the same as the combined inflated states of the first bag body 70 and the second bag body 72 of the first exemplary embodiment. Thus, the present exemplary embodiment enables basically the same advantageous effects as those of the first exemplary embodiment to be obtained.

Moreover, the number of components can be reduced compared to the first exemplary embodiment, enabling costs to be reduced.

Note that in the first to third exemplary embodiments described above, the first inflators 78, 78A, 78B, the second inflator 80, and the inflator 104 are all disk type inflators. However, the first inflators 78, 78A, 78B, the second inflator 80, and the inflator 104 may be cylinder type inflators.

In the first to third exemplary embodiments described above, the first inflators 78, 78A, 78B, the second inflator 80, and the inflator 104 are provided inside the seat cushion 12 in a state in which portions of each are inserted inside the first bag body 70, the second bag body 72, or the bag body 102. However, the first inflators 78, 78A, 78B, second inflator 80, or inflator 104 may be provided entirely inside the respective first bag body 70, second bag body 72, or bag body 102.

Fourth Exemplary Embodiment

Figure 10:
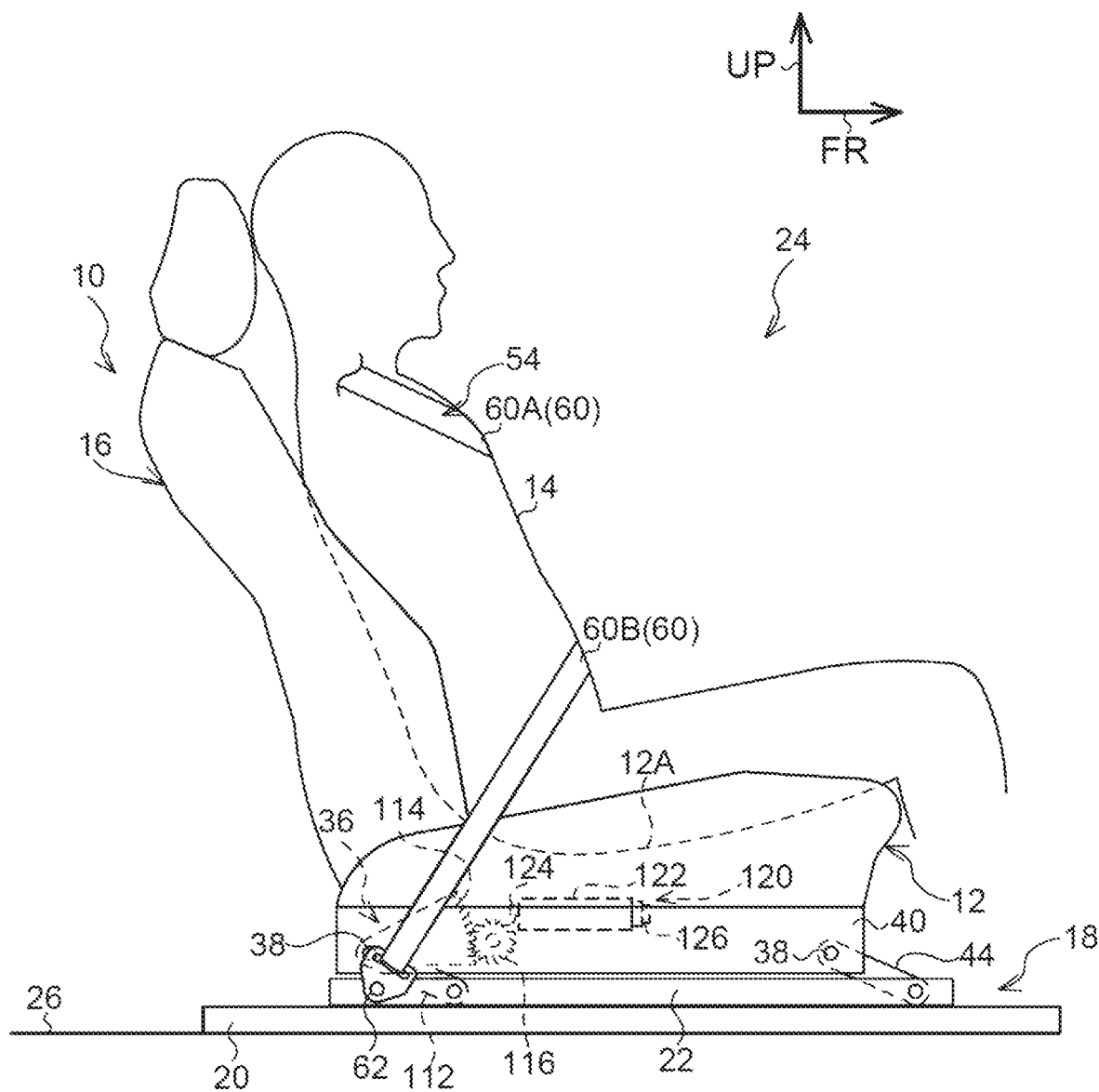
FIG. 10 is a side view illustrating a vehicle seat according to a fourth exemplary embodiment.
Figure 11:
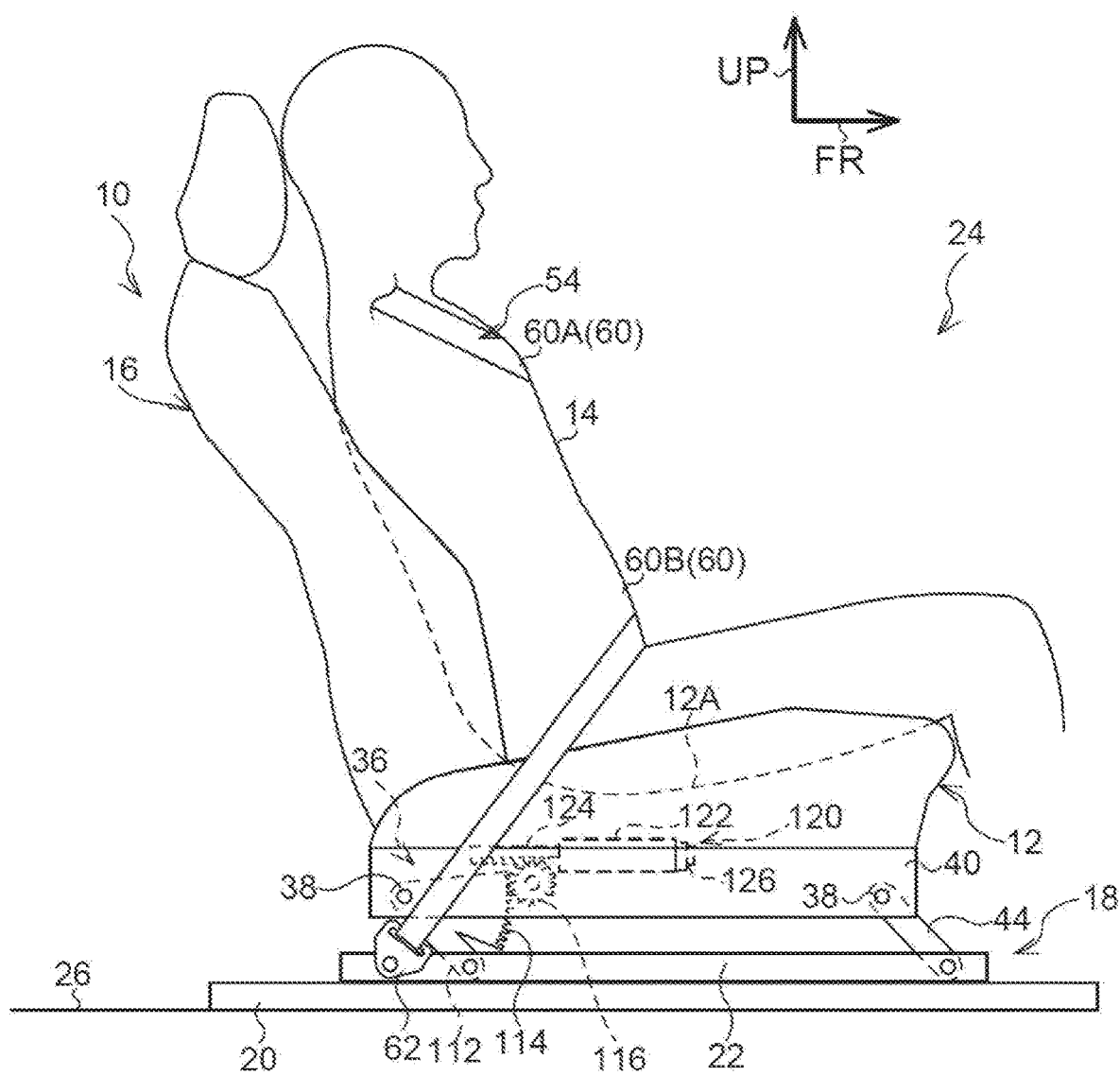
FIG. 11 is a side view corresponding to FIG. 10, illustrating an actuated state of a micro gas generator.
Figure 12:
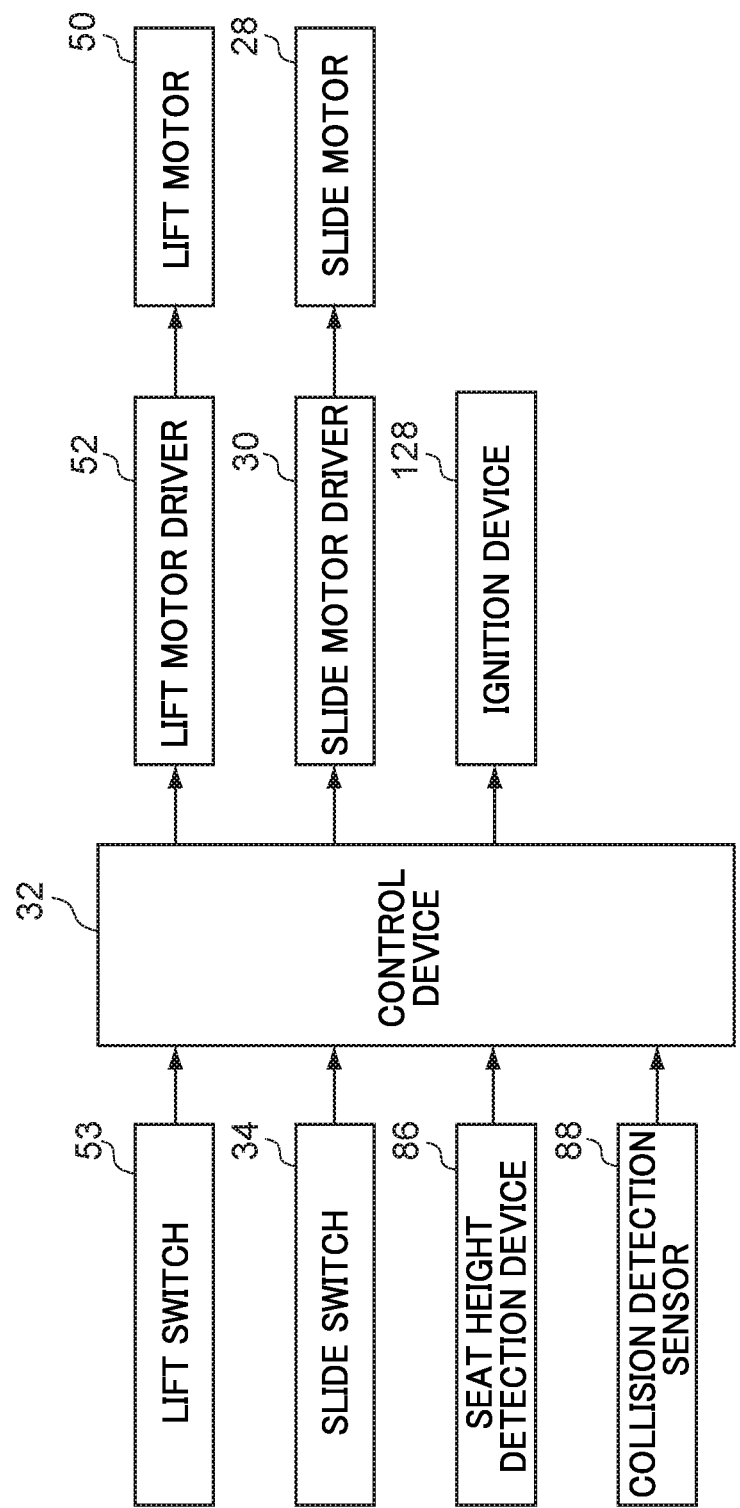
FIG. 12 is a block diagram illustrating control of a vehicle seat according to the fourth exemplary embodiment.

As illustrated in FIG. 10, in a vehicle seat 10 according to a fourth exemplary embodiment, the lift mechanism 36 configures a lifting device. The lift mechanism 36 includes an emergency drive link 112. The emergency drive link 112 is provided instead of the following link 44 at the seat rear side of the seat right side guide rail 20. A sector gear 114 is formed to the emergency drive link 112. Outer teeth are formed at a seat front side end portion of the sector gear 114. The sector gear 114 configures part of an external spur gear that is coaxial to the seat rear side rod 38.

A pinion 116 is provided at the seat front side of the sector gear 114. The pinion 116 is supported by the cushion frame 40 of the seat cushion 12, and is capable of rotating about an axis having an axial direction along the seat width direction. The sector gear 114 of the emergency drive link 112 meshes with the pinion 116 at a portion on the seat width direction right side of an axial direction intermediate portion of the pinion 116.

The lift mechanism 36 also includes an emergency drive mechanism 120. The emergency drive mechanism 120 includes a cylinder 122. The cylinder 122 is provided at the seat front side of the pinion 116, and is retained by the cushion frame 40 of the seat cushion 12. An axial direction of the cylinder 122 runs substantially along the seat front-rear direction, and the cylinder 122 is open at a seat rear side end portion.

A piston is provided inside the cylinder 122. A rack bar 124 is formed at the seat rear side of the piston. In a state prior to actuation of the emergency drive mechanism 120, teeth of the rack bar 124 are disposed at a separation to the seat front side of the pinion 116, and the teeth of the rack bar 124 do not mesh with the pinion 116 in this state. When the rack bar 124 moves toward the seat rear side, the teeth of the rack bar 124 mesh with the pinion 116. When the rack bar 124 moves further toward the seat rear side in this state, the pinion 116 is rotated.

A micro gas generator 126 (hereafter "micro gas generator 126" is abbreviated to "MGG 126") is provided at a seat front side end portion of the cylinder 122. The MGG 126 includes a gas generating agent, an ignition device 128 (see FIG. 12) to cause the gas generating agent to combust, and the like. The gas generating agent combusts on actuation of the ignition device 128. Combustion of the gas generating agent instantaneously generates gas. The gas generated in this manner is supplied into the cylinder 122 further toward the seat front side than the piston, such that the piston and therefore the rack bar 124 are moved toward the seat rear side.

The ignition device 128 of the MGG 126 is electrically connected to the control device 32. When a collision detection signal output from the collision detection sensor 88 is input to the control device 32, the control device 32 outputs an ignition signal in order to actuate the ignition device 128. When the ignition signal is input to the ignition device 128, the ignition device 128 is actuated, causing the gas generating agent in the MGG 126 to combust. When the piston and the rack bar 124 are moved toward the seat rear side by the pressure of the gas supplied into the cylinder 122, the teeth of the rack bar 124 mesh with the outer teeth of the pinion 116, such that the pinion 116 is rotated. When the rotation of the pinion 116 is transmitted to the sector gear 114 of the emergency drive link 112, the emergency drive link 112 pivots the cushion frame 40 of the seat cushion 12 so as to raise the cushion frame 40 toward the seat upper-front side.

When the body of the occupant 14 moves toward the seat upper side due to the cushion frame 40 being raised in this manner, the buckle 66 moves toward the seat lower side relative to the body of the occupant 14. The lap webbing 60B thereby attempts to move toward the seat lower side relative to the body of the occupant 14 so as to follow the body of the occupant 14. When the lap webbing 60B moves relative to the body of the occupant 14 in this manner, the overlap OL between the lap webbing 60B and the pelvis area of the occupant 14 increases (see FIG. 5(A), etc.).

Thus, in the vehicle seat 10, a reduction in the overlap OL of the lap webbing 60B with the pelvis area of occupant 14 in a vehicle collision can be suppressed, and a reduction in the restraint performance of the pelvis area of the occupant 14 by the lap webbing 60B in a vehicle collision can be suppressed.

Moreover, when the lower limbs of the occupant 14 are moved toward the seat upper side by raising the cushion frame 40, movement, primarily of the lower limbs of the occupant 14, toward the seat front side under inertia is suppressed. This enables the occurrence of the submarining phenomenon, in which the occupant 14 moves toward the seat front side due to sliding under the seat lower side of the lap webbing 60B, to be suppressed, enabling the body (pelvis area) of the occupant 14 to be effectively restrained by the lap webbing 60B.

Fifth Exemplary Embodiment

Figure 13:
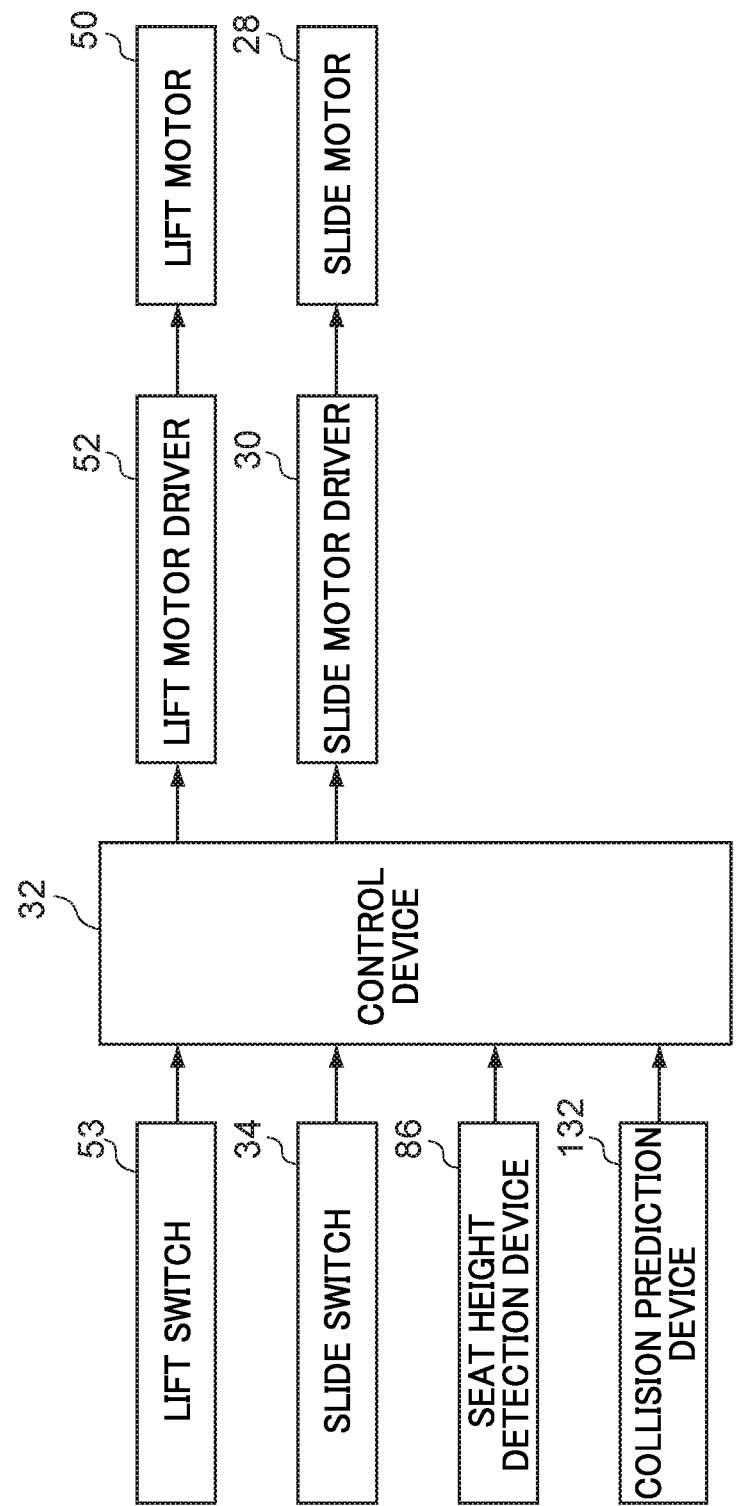
FIG. 13 is a block diagram illustrating control of a vehicle seat according to a fifth exemplary embodiment.

As illustrated in FIG. 13, the control device 32 of a vehicle seat 10 according to a fifth exemplary embodiment is electrically connected to a collision prediction device 132. The collision prediction device 132 includes for example a millimeter wave radar device provided at a front end portion of the vehicle 24. The millimeter wave radar device emits millimeter waves ahead of the vehicle 24, and receives reflected waves reflected by obstacles in front of the vehicle 24 (including other vehicles in front of the vehicle 24). The collision prediction device 132 measures the distances to these obstacles based on the time taken for the millimeter waves emitted from the millimeter wave radar device to be reflected by the obstacles and the reflected waves to be received by the millimeter wave radar device.

A collision prediction signal output from the collision prediction device 132 is input to the control device 32. When, based on the collision prediction signal input to the control device 32, the control device 32 determines that a distance to an obstacle is less than a fixed value, a lift operation signal to drive the lift motor 50 is output from the control device 32. When the lift operation signal is input to the lift motor driver 52, the lift motor driver 52 drives the lift motor 50 so as to raise the seat cushion 12.

Figure 14:
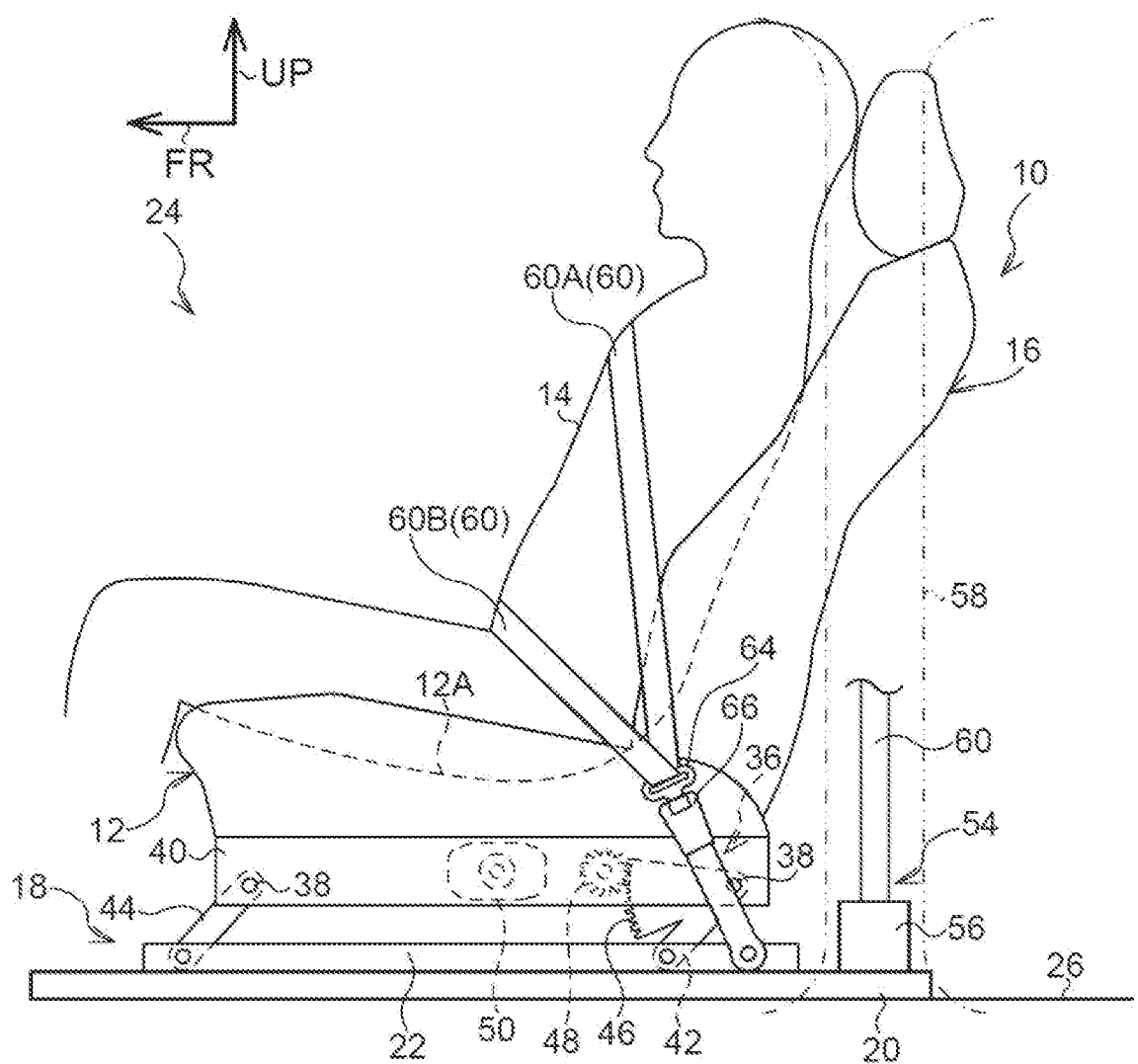
FIG. 14 is a side view illustrating an actuated state of a lift motor of a vehicle seat according to the fifth exemplary embodiment.

As illustrated in FIG. 14, when the body of the occupant 14 moves toward the seat upper side due to raising the cushion frame 40 in this manner, the buckle 66 moves toward the seat lower side relative to the body of the occupant 14. The lap webbing 60B thereby attempts to move toward the seat lower side relative to the body of the occupant 14 so as to follow the body of the occupant 14. When the lap webbing 60B moves relative to the body of the occupant 14 in this manner, the overlap OL between the lap webbing 60B and the pelvis area of the occupant 14 increases (see FIG. 5(A), etc.).

Thus, in the vehicle seat 10, a reduction in the overlap OL of the lap webbing 60B with the pelvis area of occupant 14 in a vehicle collision can be suppressed, and a reduction in the restraint performance of the pelvis area of the occupant 14 by the lap webbing 60B in a vehicle collision can be suppressed.

Moreover, when the lower limbs of the occupant 14 are moved toward the seat upper side by raising the cushion frame 40, movement, primarily of the lower limbs of the occupant 14, toward the seat front side under inertia is suppressed. This enables the occurrence of the submarining phenomenon, in which the occupant 14 moves toward the seat front side due to sliding under the seat lower side of the lap webbing 60B, to be suppressed, enabling the body (pelvis area) of the occupant 14 to be effectively restrained by the lap webbing 60B.

Thus, in the present exemplary embodiment, the lift mechanism 36 configures a lifting device, and the seat cushion 12 is raised by drive force from the lift motor 50 in cases in which a distance to an obstacle in front of the vehicle 24 is less than a fixed value. Accordingly, if a collision between the vehicle 24 and the obstacle is avoided, similar control can be repeated in the future.

In the present exemplary embodiment, the control device 32 drives the lift motor 50 based on the collision prediction signal. However, the control device 32 may also drive the lift motor 50 when a head-on collision of the vehicle 24 has occurred.

Moreover, the other exemplary embodiments described above may be combined with the fifth exemplary embodiment. As an example, in a configuration in which the first exemplary embodiment and the fifth exemplary embodiment are combined, the seat cushion 12 is raised by a fixed amount by drive force from the lift motor 50 in cases in which a distance to an obstacle in front of the vehicle 24 is less than a fixed value, after which the first bag body 70 and the second bag body 72 of the first exemplary embodiment are inflated so as to further raise the seat face 12A of the seat cushion 12 in cases in which the vehicle 24 goes on to collide with the obstacle.

In such a configuration, the seat cushion 12 has already been raised by a fixed amount when the first bag body 70 and the second bag body 72 start to inflate. Thus, the seat face 12A of the seat cushion 12 can be sufficiently raised in a head-on collision of the vehicle 24, even if the first bag body 70 and the second bag body 72 have small inflation amounts. This enables the time taken for the seat face 12A of the seat cushion 12 to be sufficiently raised to be shortened. Moreover, the outputs of the first inflator 78 that inflates the first bag body 70 and the second inflator 80 that inflates the second bag body 72 can be reduced, thereby for example enabling the first inflator 78 and the second inflator 80 to be reduced in size.

As illustrated in FIG. 15 as an example, the vehicle seat 10 includes a Central Processing Unit (CPU) 201, a primary storage section 202, a secondary storage section 203, and an external interface 204. The CPU 201 is an example of a processor, this being hardware. The CPU 201, the primary storage section 202, the secondary storage section 203, and the external interface 204 are connected together through a bus 209.

The primary storage section 202 is volatile memory such as Random Access Memory (RAM). The secondary storage section 203 is non-volatile memory such as a Hard Disk Drive (HDD) or a Solid State Drive (SSD).

The secondary storage section 203 includes a program holding region 203A and a data holding region 203B. As an example, the program holding region 203A stores programs such as a control program for executing the above-described control processing. As an example, the data holding region 203B stores intermediate data generated during execution of the control program.

The CPU 201 reads the control program from the program holding region 203A and expands the control program into the primary storage section 202. The CPU 201 operates as the control device in FIG. 3, FIG. 8, FIG. 12, or FIG. 13 by loading and executing the control program.

Note that programs such as the control program may be stored in an external server and expanded into the primary storage section 202 via a network. Alternatively, programs such as the control program may be stored in a non-transitory recording medium such as a Digital Versatile Disc (DVD) and expanded into the primary storage section 202 via a recording medium reader device.

External devices are connected to the external interface 204, and the external interface 204 oversees the exchange of various information between the external devices and the CPU 201. As illustrated the example in FIG. 3, the lift switch 53, the slide switch 34, the seat height detection device 86, the collision detection sensor 88, the lift motor driver 52, the slide motor driver 30, the first ignition device 82, and the second ignition device 84 may be connected to the external interface 204. As illustrated in the example in FIG. 8, the lift switch 53, the slide switch 34, the seat height detection device 86, the collision detection sensor 88, the physical build detection device 92, the lift motor driver 52, the slide motor driver 30, the first ignition device 82A, the first ignition device 82B, and the second ignition device 84 may be connected to the external interface 204. As illustrated in the example in FIG. 12, the lift switch 53, the slide switch 34, the seat height detection device 86, the collision detection sensor 88, the lift motor driver 52, the slide motor driver 30, and the ignition device 128 may be connected to the external interface 204. As illustrated in the example in FIG. 13, the lift switch 53, the slide switch 34, the seat height detection device 86, the collision prediction device 132, the lift motor driver 52, and the slide motor driver 30 may be connected to the external interface 204.

An object of the present disclosure is to obtain a vehicle seat capable of suppressing a reduction in the overlap between a webbing and the pelvis area of an occupant in cases in which a collision or a predicted collision of a vehicle has been detected.

A first aspect of the disclosure is a vehicle seat that includes: a seat cushion on which an occupant is able to sit, and that is configured to be raised and lowered in a seat vertical direction; a buckle that is attachable to an attachment location that is not subject to the raising or lowering of the seat cushion, and that retains a tongue provided at an elongated belt shaped webbing, in a state in which in the webbing is worn over at least a pelvis area of the occupant; and a lifting device that is actuated, in a case in which a collision or a predicted collision of a vehicle has been detected, so as to move the occupant, in a case in which the occupant is sitting on the seat cushion, toward an upper side of the seat at a location further toward a rear side of the seat than a central portion of the seat cushion in a front-rear direction of the seat.

According to the vehicle seat of the first aspect, when the lifting device is actuated in cases in which a collision or a predicted collision of the vehicle has been detected, the occupant sitting on the seat cushion is moved toward the seat upper side by the lifting device. The lifting device moves the occupant toward the seat upper side at a location further toward the seat rear side than the seat front-rear direction central portion (the seat front-rear direction center and the vicinity thereof) of the seat cushion, such that the pelvis area of the occupant is moved toward a vehicle upper side by actuation of the lifting device.

The buckle of the seatbelt device does not follow this raising or lowering of the seat cushion, with the result that the buckle is moved toward a vehicle lower side relative to the body of the occupant when the occupant is moved toward the seat upper side. Due to this movement of the buckle relative to the body of the occupant, a portion of the webbing that restrains the pelvis area of the occupant attempts to move toward the seat lower side relative to the body of the occupant. This movement of the webbing relative to the body of the occupant acts to increase the overlap between the webbing and the pelvis area of the occupant.

A second aspect is the vehicle seat of the first aspect, wherein the lifting device moves the occupant, in a case in which the occupant is sitting on the seat cushion, toward the seat upper side at both a location that is further toward the seat rear side than the seat front-rear direction central portion of the seat cushion and a location that is further toward a seat front side than the seat front-rear direction central portion of the seat cushion.

According to the vehicle seat of the second aspect, when the lifting device is actuated, the lifting device moves the occupant toward the seat upper side not only at the location further toward the seat rear side than the seat front-rear direction central portion of the seat cushion, but also at the location further toward the seat front side than the seat front-rear direction central portion of the seat cushion. The lower limbs of the occupant sitting on the seat cushion are thus moved toward the seat upper side.

A third aspect of the disclosure is the vehicle seat of the second aspect, wherein an amount of movement of the occupant by the lifting device toward the seat upper side, at the location further toward the seat rear side than the seat front-rear direction central portion of the seat cushion, is smaller than an amount of movement of the occupant by the lifting device toward the seat upper side, at the location further toward the seat front side than the seat front-rear direction central portion of the seat cushion.

According to the vehicle seat of the third aspect, when the lifting device is actuated, the pelvis area of the occupant and the lower limbs of the occupant are moved toward the seat upper side. Note that when the lifting device is actuated, the movement amount of the occupant toward the seat upper side at the location further toward the seat rear side than the seat front-rear direction central portion of the seat cushion is smaller than the movement amount of the occupant toward the seat upper side at the location further toward the seat front side than the seat front-rear direction central portion of the seat cushion. When the lifting device is actuated, the lower limbs of the occupant are therefore moved further toward the vehicle upper side than the pelvis area of the occupant.

A fourth aspect of the disclosure is the vehicle seat of any of the first aspect to the third aspect, wherein, in a case in which a physique of the occupant is smaller than a predetermined size, the lifting device reduces an amount of movement of the occupant by the lifting device toward the seat upper side at the location further toward the seat rear side than the seat front-rear direction central portion of the seat cushion, compared to a case in which the physique of the occupant is equal to or larger than the predetermined size.

According to the vehicle seat of the fourth aspect, in cases in which the physical build of the occupant is smaller than the predetermined size, the movement amount of the occupant by the lifting device toward the seat upper side at the location further toward the seat rear side than the seat front-rear direction central portion of the seat cushion is smaller than that in cases in which the physical build of the occupant is the predetermined size or larger. Accordingly, the movement amount of the pelvis area of the occupant toward the vehicle upper side is smaller in cases in which the physical build of the occupant is smaller than the predetermined size than that in cases in which the physical build of the occupant is the predetermined size or larger.

A fifth aspect of the disclosure is the vehicle seat of any of the first aspect to the fourth aspect, wherein the lifting device includes: a gas generating device that generates gas when actuated, and a bag body that is provided inside the seat cushion, and that presses a seat face at the seat upper side of the seat cushion upward toward the seat upper side when inflated by pressure of the gas, which is supplied into the bag body.

According to the vehicle seat of the fifth aspect, gas is generated by the gas generating device of the lifting device when the gas generating device is actuated in cases in which a collision or a predicted collision of the vehicle has been detected. This gas is supplied inside the bag body provided inside the seat cushion such that the bag body inflates under the pressure of the gas. The seat face at the seat upper side of the seat cushion is pressed upward toward the seat upper side by the inflated bag body such that the pelvis area of the occupant is moved toward the seat upper side together with the seat face of the seat cushion.

As described above, in the vehicle seat of the first aspect, the portion of the webbing that restrains the pelvis area of the occupant in cases in which a collision or a predicted collision of the vehicle has been detected attempts to move relative to the body of the occupant, thereby increasing the overlap between the webbing and the pelvis area of the occupant. This thereby enables a reduction in the overlap between the webbing and the pelvis area of the occupant to be suppressed.

In the vehicle seat of the second aspect, the lower limbs of the occupant sitting on the seat cushion are moved toward the seat upper side when the lifting device is actuated, enabling the occurrence of a phenomenon in which the body of the occupant slides toward the front so as to come out from under the webbing (a "submarining" phenomenon) to be suppressed.

In the vehicle seat of the third aspect, the lower limbs of the occupant are moved further toward the vehicle upper side than the pelvis area of the occupant when the lifting device is actuated, enabling the occurrence of the submarining phenomenon to be even more effectively suppressed.

In the vehicle seat of the fourth aspect, in cases in which the physical build of the occupant is smaller than the predetermined size, the pelvis area of the occupant is not moved as far toward the vehicle upper side, enabling the seat vertical direction height of the lower limbs of any occupant to be set substantially the same, regardless of the physical build of the occupant.

In the vehicle seat of the fifth aspect, the pelvis area of the occupant can be moved toward the seat upper side together with the seat face of the seat cushion by the inflated bag body.

The invention claimed is:

1. A vehicle seat, comprising:
   a seat cushion on which an occupant of a vehicle having the vehicle seat is able to sit, and that is configured to be raised and lowered in a seat vertical direction;
   a buckle that is attachable to an attachment location that is not subject to the raising or lowering of the seat cushion, and that retains a tongue provided at an elongated belt shaped webbing, in a state in which the webbing is worn over at least a pelvis area of the occupant when seated in the vehicle seat; and
   a lifting device that is actuated, in a case in which a collision or a predicted collision of the vehicle has been detected, so as to move the occupant, in a case in which the occupant is sitting on the seat cushion, toward an upper side of the seat both at (i) a first location further toward a rear side of the seat than a central portion of the seat cushion in a front-rear direction of the seat and (ii) a second location that is further toward a seat front side than the seat front-rear direction central portion of the seat cushion,
   wherein an amount of movement of the occupant by the lifting device toward the seat upper side, at the first location further toward the seat rear side than the seat front-rear direction central portion of the seat cushion, is smaller than an amount of movement of the occupant by the lifting device toward the seat upper side, at the second location further toward the seat front side than the seat front-rear direction central portion of the seat cushion, and
   the lifting device includes:
     a gas generating device that generates gas when actuated,
     a first bag body that is provided inside the seat cushion at the first location, that presses a seat face at the seat upper side of the seat cushion upward toward the seat upper side when inflated by pressure of the gas that is supplied into the first bag body, and that is disposed at a seat lower side adjacent to a backrest of the vehicle seat when the vehicle seat is viewed from a side of the vehicle, and
     a second bag body that is provided inside the seat cushion at the second location, that presses the seat face at the seat upper side of the seat cushion upward toward the seat upper side when inflated by pressure of the gas that is supplied into the second bag body, and that is disposed at the seat lower side further toward the seat front side than the first bag body when the vehicle seat is viewed from the side of the vehicle,
   wherein, in a case in which a physique of the occupant is smaller than a human dummy of an adult female in a $5^{th}$ percentile, the lifting device reduces an amount of movement of the seat cushion toward the seat upper side at the first location compared to a case in which the physique of the occupant is equal to or larger than the human dummy of the adult female in the $5^{th}$ percentile.

2. The vehicle seat of claim 1, wherein:
   the gas generating device comprises a first inflator and a second inflator;
   the first inflator is provided inside the seat cushion in a state in which a portion of the first inflator is inside the first bag body; and
   the second inflator is provided inside the seat cushion, in a state in which a portion of the second inflator is inside the second bag body.

* * * * *